(12) United States Patent
Yoshida et al.

(10) Patent No.: US 9,600,201 B2
(45) Date of Patent: Mar. 21, 2017

(54) STORAGE SYSTEM AND METHOD FOR DEDUPLICATING DATA

(71) Applicant: Hitachi, Ltd., Tokyo (JP)

(72) Inventors: Misato Yoshida, Tokyo (JP); Mitsuo Hayasaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 174 days.

(21) Appl. No.: 14/424,177

(22) PCT Filed: Mar. 27, 2014

(86) PCT No.: PCT/JP2014/058861
§ 371 (c)(1),
(2) Date: Feb. 26, 2015

(87) PCT Pub. No.: WO2015/145661
PCT Pub. Date: Oct. 1, 2015

(65) Prior Publication Data
US 2016/0259590 A1    Sep. 8, 2016

(51) Int. Cl.
*G06F 15/173* (2006.01)
*G06F 3/06* (2006.01)
*H04L 12/24* (2006.01)
*H04L 29/08* (2006.01)
*G06F 12/00* (2006.01)

(52) U.S. Cl.
CPC .............. *G06F 3/0641* (2013.01); *G06F 3/06* (2013.01); *G06F 3/065* (2013.01); *G06F 3/067* (2013.01); *G06F 3/0608* (2013.01); *G06F 3/0619* (2013.01); *H04L 41/0213* (2013.01); *H04L 67/1095* (2013.01); *H04L 67/1097* (2013.01)

(58) Field of Classification Search
USPC ................................ 709/203, 223–229, 250
See application file for complete search history.

(56) References Cited

U.S. PATENT DOCUMENTS

| 2010/0333116 | A1* | 12/2010 | Prahlad ............... G06F 17/3002 719/328 |
| 2012/0221817 | A1 | 8/2012 | Yueh |
| 2012/0330903 | A1* | 12/2012 | Periyagaram ......... G06F 3/0608 707/692 |
| 2013/0086006 | A1* | 4/2013 | Colgrove .............. G06F 3/0688 707/692 |

(Continued)

FOREIGN PATENT DOCUMENTS

| JP | 2011-065314 A | 3/2011 |
| JP | 2011-191933 A | 9/2011 |

(Continued)

*Primary Examiner* — Zarni Maung
(74) *Attorney, Agent, or Firm* — Mattingly & Malur, PC

(57) ABSTRACT

The present invention provides a storage system capable of performing deduplication among nodes in a cluster configuration with a low overhead. The respective nodes mutually monitor whether there is update of deduplication information in other nodes. When it is determined in its own node that there is update in another node, it reflects the update information in another node to the deduplication information of its own node. Then, each node uses the deduplication information having reflected the deduplication information of other nodes to perform deduplication of the storage data of its own node.

15 Claims, 16 Drawing Sheets

(56) References Cited

U.S. PATENT DOCUMENTS

| | | |
|---|---|---|
| 2013/0086007 A1 | 4/2013 | Bandopadhyay |
| 2013/0238572 A1* | 9/2013 | Prahlad ............ G06F 17/30082 |
| | | 707/692 |
| 2015/0261776 A1* | 9/2015 | Attarde ............ G06F 17/30156 |
| | | 707/664 |

FOREIGN PATENT DOCUMENTS

| | | |
|---|---|---|
| JP | 2012-190099 A | 10/2012 |
| JP | 2012-238125 A | 12/2012 |

\* cited by examiner

STORAGE SYSTEM AND METHOD FOR DEDUPLICATING DATA

TECHNICAL FIELD

The present invention relates to a storage system and a method for deduplicating data.

BACKGROUND ART

A storage system connected to a host computer (client) via a network has multiple HDDs as storage devices for storing data, for example. Deduplication is an example of an art for reducing the amount of storage data when storing data to the storage device to reduce the costs of storage media. In deduplication, data segments storing the identical contents in files are contracted to reduce the total amount of data capacity stored in file systems and storage systems.

There are cases where a storage system adopting a cluster configuration is utilized with the aim to increase the speed and availability of the deduplication process. In that case, data having identical contents may exist among different nodes of the cluster configuration, and the deduplication efficiency in the cluster configuration can be improved by performing deduplication of data having the same contents. Patent Literature 1 teaches an art related to this technique, which discloses a method for performing deduplication among nodes by providing a master server for managing deduplication information of respective nodes.

CITATION LIST

Patent Literature

[PTL 1] US Patent Application Publication No. 2012/0221817

SUMMARY OF INVENTION

Technical Problem

However, according to the method taught in Patent Literature 1, a process is required to send an inquiry to the master server through the network during storage of data, which becomes a bottleneck of performance. Further, the load applied to the master server is high so that failure may occur to the master server, and when failure occurs, deduplication across different nodes cannot be performed. Therefore, one of the problems to be solved by the present invention is to realize node-to-node deduplication of a cluster configuration with a low overhead during storage of data.

Solution to Problem

In order to solve the above problem, the storage system provided according to a preferred embodiment of the present invention adopts a cluster configuration having two or more nodes, wherein the respective nodes mutually acquire deduplication information of other nodes, and deduplication of contents stored in its own node is performed based on the acquired deduplication information of other nodes and deduplication information of its own node.

Advantageous Effects of Invention

According to the present invention, inter-node deduplication becomes possible while maintaining a data processing performance during storage of data from a superior device, so that the deduplication rate can be improved and efficient use of storage capacity is realized. The problems, configurations and effects other than those mentioned above are made clear in the following description of preferred embodiments.

DESCRIPTION OF EMBODIMENTS

Figure 1:
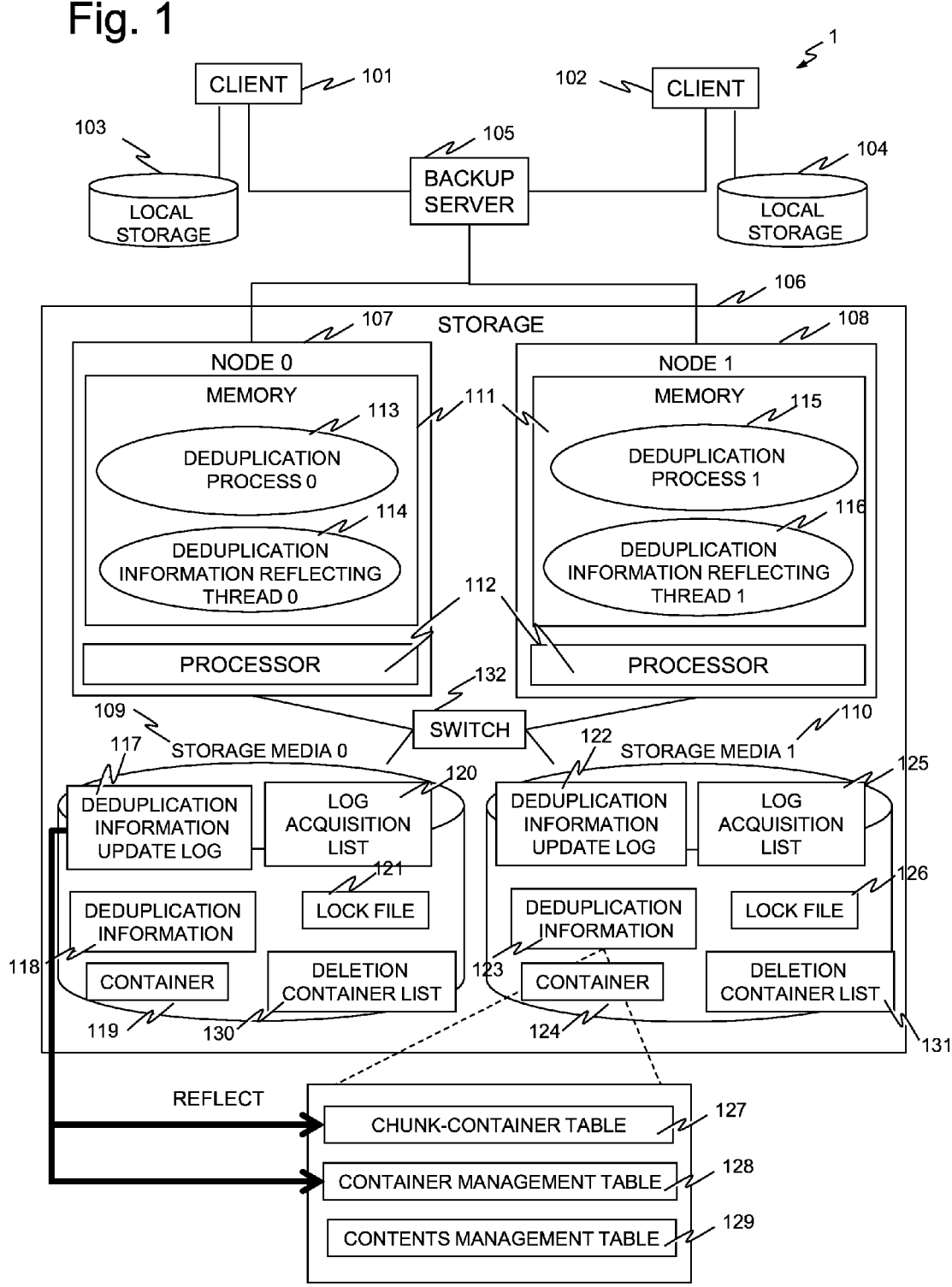
FIG. 1 is a block diagram illustrating a hardware configuration of a computer system according to a preferred embodiment of the present invention.

Now, the preferred embodiments will be described with reference to the drawings. In the following description, various information are referred to as "management tables", for example, but the various information can also be expressed by data structures other than tables. Further, the "management table" can also be referred to as "management information" to show that the information does not depend on the data structure.

The processes are sometimes described using the term "program" as the subject. The program is executed by a processor such as an MP (Micro Processor) or a CPU (Central Processing Unit) for performing determined processes. A processor can also be the subject of the processes since the processes are performed using appropriate storage resources (such as memories) and communication interface devices (such as communication ports). The processor can also use dedicated hardware in addition to the CPU. The computer programs can be installed to each computer from a program source. The program source can be provided via a program assignment server or a storage media, for example.

Each element, such as each controller, can be identified via numbers, but other types of identification information such as names can be used as long as they are identifiable information. The equivalent elements are denoted with the same reference numbers in the drawings and the description of the present invention, but the present invention is not restricted to the present embodiments, and other modified examples in conformity with the idea of the present invention are included in the technical scope of the present invention. The number of each component can be one or more than one, unless defined otherwise.

The present embodiment illustrates an example where the number of nodes is two, but the present embodiment is also applicable to a case where the number of nodes is greater than two. According to the present embodiment, the information of other nodes are acquired by performing a read-only mount (a path connection only allowing read and not allowing write, hereinafter referred to as read mount or RO mount) of storage media of other nodes, but other methods can also be adopted, such as an NFS (Network File System) mount or use of a network. A data segment being the deduplication unit is called a chunk, and logically gathered data which is the unit of storing data is called a content, wherein a single content is composed of one or more chunks. Contents include normal files, archive files, backup files, and files having gathered normal files, such as volume files of a virtual computer. The deduplication process is composed of a process for sequentially cutting out chunks from a content, a process for determining whether the cut-out chunk is duplicated or not, and a process for storing the chunk. Further, in the following description, the reference number may be shown by numbers in brackets, such as Node 0 (107).

The use case (product application example) of the present embodiment includes deduplication related to data used in a duplicated manner in client terminals, such as a virtual desktop and a security patch. For example, as for mails in a virtual desktop used by an extremely large number of users, mails with attachments sent to the respective users are stored in the storage media. If multiple identical mail bodies and attachments are stored in a duplicated manner in the storage media, the total capacity of the storage data will become excessive. Therefore, the present embodiment described hereafter is applied to a storage system having a cluster configuration in order to shorten the time of the deduplication process and to improve the deduplication rate.

FIG. 1 is a block diagram illustrating a hardware configuration of a computer system according to the present embodiment. A computer system 1 comprises clients 101/102, a backup server 105, and a storage system 106. Each client 101/102 has a local storage 103/104, wherein the backup server 105 gathers the data stored in these local storages 103/104 as a backup file, and stores the same in the storage system 106.

In the configuration of FIG. 1, the access from the client 101/102 to the storage system 106 is performed by the backup server 105, but it is also possible to adopt a configuration where there is no backup server 105 and the client 101/102 directly accesses the storage system 106. The storage system 106 includes Node 0 (107) and Node 1 (108). These nodes are computers, each having a processor 112 and a memory 111. The respective nodes can access storage media 0 (109) and storage media 1 (110) via a switch 132. The switch 132 can be, for example, a SAS-I/F such as a SAS (Serial Attached SCSI) expander or a SATA (Serial ATA)-I/F, and it can also adopt a network switch.

A deduplication process 113/115 and a deduplication information reflecting thread 114/116 stored in the memory 111 of each node controls the deduplication process. When a request to store a backup file (content) is received from the backup server 105, the deduplication process 113/115 uses a deduplication information 118/123 to execute deduplication (in-line deduplication), stores the result thereof in a storage area called a container of the storage media, and updates the deduplication information 118/123. A container refers to an area for storing one or more chunks. A chunk is a data unit having divided one content into one or more parts. A container 119/124 has one or more container bodies, wherein one container body stores a content, which is a backup file, divided into chunk units, but in some cases, a single chunk constitutes a single content. The registration timing thereof to a deduplication information update log file (hereinafter referred to as deduplication information update log) 117/122 is the writing of non-duplicated data in its own node and the writing of duplicated data in another node.

The deduplication information 118/123 is composed of a chunk-container table 127, a container management table 128, and a content management table 129. The chunk-container table 127 is a table for managing the chunk having performed deduplication. The container management table 128 is a table for managing the chunk stored in the container. The content management table 129 is a table for managing the chunk information constituting the content, and the chunk storage information. The update information of the deduplication information 118/123 is also registered in a deduplication information update log 117/122 managing the update of the deduplication information 118/123 as a log file (hereinafter referred to as log). Further, in the deduplication process, the data that does not correspond to the stored data and requires to be newly stored is stored in the container 119/124.

The deduplication information reflecting thread 114/116 performs a read-mount of storage media 109/110 other than its own node, acquires the deduplication information update log 117/122 of other nodes, and reflects the same in the deduplication information 118/123 of its own node. For example, the deduplication information reflecting thread 0 (114) performs read-mount of the storage media 1 (110) disposed in a node other than its own node, and reflects the deduplication information update log 122 of other nodes in the deduplication information 118 of its own node. Then, the deduplication information reflecting thread 114/116 registers the file name of the reflected deduplication information update log 117/122 in a log acquisition list 120/125 of its own node. A log acquisition list is a list for storing and managing names of deduplication information update log files (hereinafter referred to as deduplication information update log name) of other nodes reflected in its own node.

In the above-described reflection process, the deduplication process 113/115 writes the deduplication information update log name being edited in a lock file 121/126, so that the name of the file being edited can be identified to prevent the deduplication information update log 117/122 being edited from being read in the other node. The lock file 121/126 refers to a file for performing exclusive control so that the deduplication information update log being edited is not edited in a node other than the node performing the editing process. Further, the deduplication information reflecting thread 114/116 confirms whether the deduplication information update log 117/122 is reflected in other nodes by using the log acquisition list 120/125 of other nodes. As a result, if it is determined that the update is reflected, the deduplication information reflecting thread 114/116 deletes the deduplication information update log 117/122.

In the present embodiment, the update portion of deduplication information in other nodes is reflected in the deduplication information of its own node. Therefore, the data storage status in other nodes can be recognized in its own node, and deduplication becomes possible even in cases where the same data exists in other nodes. Especially according to the present embodiment, upon recognizing the data storage status in other nodes, a distribution processing method is adopted where each node performs read mount of storage media of the other node and the update information is mutually reflected in the nodes without using a management server, so that the load of the process can be reduced. As a result, deduplication is made possible while maintaining the processing performance, such as when performing backup in a case where multiple clients retain the same data, as in a virtual desktop or a security patch. It is also possible to have metadata (information such as deduplication information, list information such as a log acquisition list, and file information such as a lock file) stored in the memory 111, and to have the processor 112 of each node refer to the metadata in the memory 111 of the other nodes either directly or via a switch 132 to perform deduplication.

Figure 2:
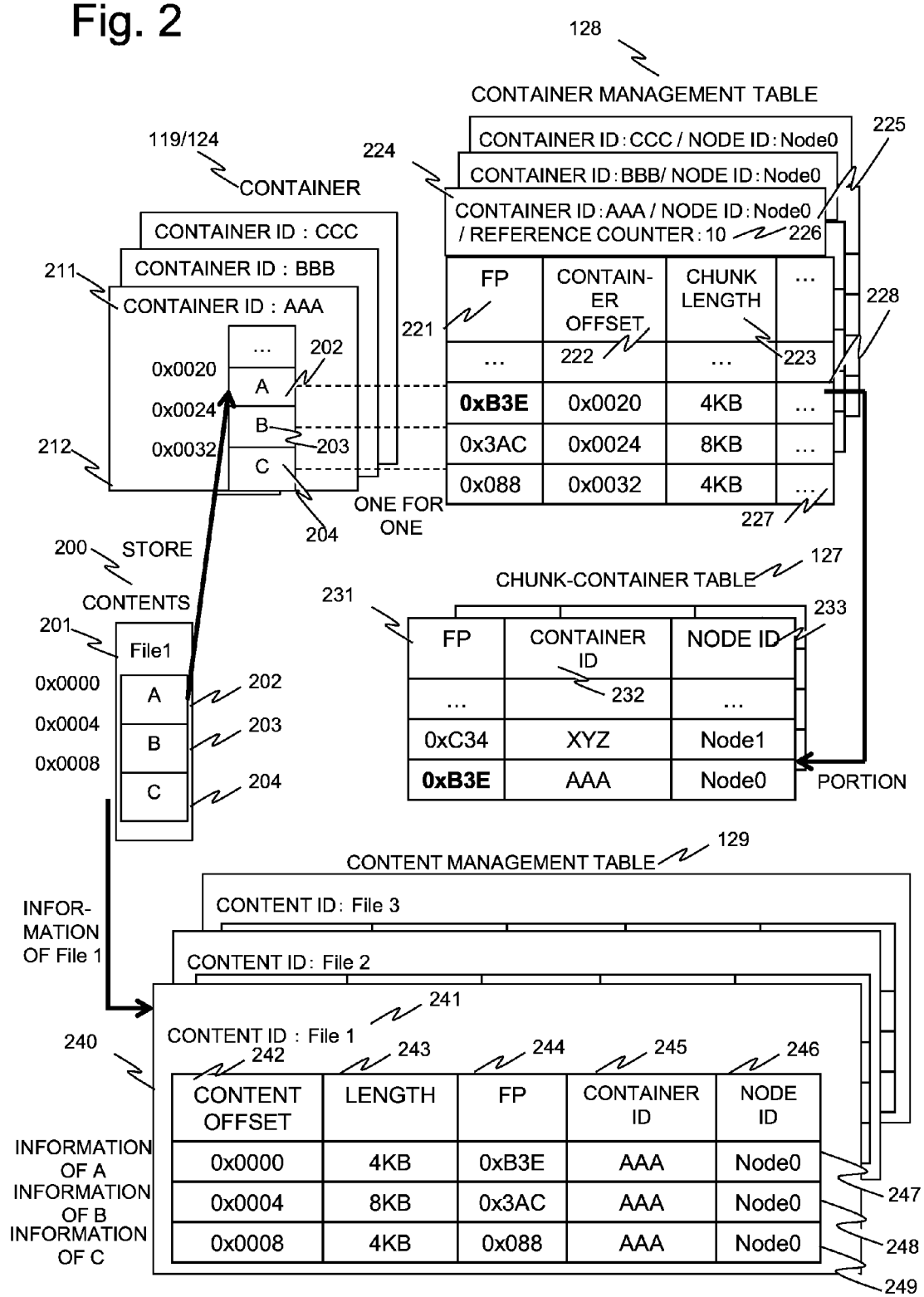
FIG. 2 is a data configuration diagram illustrating a corresponding relationship between contents, containers and deduplication information.

FIG. 2 is a data configuration diagram illustrating a corresponding relationship between the contents, the containers and the deduplication information. In the present embodiment, a deduplication process (S302 of FIG. 3) is performed in chunk units regarding this data structure. The deduplication information 118/123 of FIG. 1 corresponds to the chunk-container table 127, the container management table 128 and the content management table 129.

A content 200 is divided into one or more chunks having either a fixed length or a variable length, and stored in the container 119/124. At this time, a chunk already stored in the container 119/124 will not be stored. The container management table 128 has a one-to-one correspondence with the container 119/124, and each entry corresponds to each chunk being stored. A finger print (FP) for uniquely identifying the corresponding chunk is stored in an FP field 221 of the entry. A finger print is an output value of the hash function, and the details thereof will be described later.

An offset of the chunk in the container is stored in a container offset field 222, and a length of the chunk is stored in a chunk length field 223. Other information related to the corresponding chunk may also be stored in the container management table 128. Further, a container ID 224 showing the ID of a container in which the chunk group is stored, a node ID 225 showing the ID of a node in which the container is stored, and a reference counter 226 showing the number of times the chunk stored in the container shown by the container ID 224 has been referred to are stored in the container management table 128. Based on the reference counter 226, it becomes possible to determine containers that are frequently referred to and containers that have become unnecessary.

Now, we will describe an example of storing chunks to the container 119/124 and storing management information to the container management table 128 when storing File 1 (201) as the content 200. File 1 (201) is divided into a Chunk A 202 (size: 4 KB), a Chunk B 203 (size: 8 KB), and a Chunk C 204 (size: 4 KB), and the FP thereof are "0xB3E", "0x3AC" and "0x088", respectively. It is assumed that in the present state, there is no chunk corresponding to the respective chunks stored in the container 119/124. The container 119/124 illustrated in FIG. 2 is assumed to exist in Node 0. The offset of the content and the offset of the container are as shown in FIG. 2.

Since there is no corresponding chunk, Chunk A 202, Chunk B 203 and Chunk C 204 are newly stored in the container 119. In the present specification, it is assumed that the above-mentioned chunk group is stored in a container 212 having a container ID 211 of "AAA". It is also possible to compress the chunk to reduce the capacity thereof before storing the same.

Since the above-mentioned chunk group is stored in the container 212 having a container ID 211 of "AAA", the information of table 227 where the container ID 224 is "AAA" is updated in the container management table 128.

The FP of Chunk A 202, which is "0xB3E", is stored in the FP field 221 of the entry corresponding to Chunk A 202. An offset "0x0020" of Chunk A 202 in the container 212 is stored in the container offset field 222. A size "4 KB" of Chunk A 202 is stored in a chunk length 223. When information of Chunk B 203 and Chunk C 204 are similarly stored in the respective entries of the table, a table 227 or a similar table is formed.

Further, the reference counter 226 of the container 212 in which the container ID 211 is "AAA" is increased by three, since three chunks, Chunk A 202, Chunk B 203 and Chunk C 204, have been added. For example, if the reference counter 226 of the container management table 128 is "7" prior to storing the above-mentioned chunk group in the container 212, the reference counter 226 will be "10" after storing the above-mentioned chunk group.

The above example illustrates a case where the reference counter 226 is increased by storing new chunks, but after newly storing the chunks, if a different content including the chunk stored in the container 212 is stored, the reference counter 226 of the table 227 will be increased. For example, if a different content including Chunk A 202 is stored, the reference counter 226 of the table 227 will be increased. In the above example, the storage of the already stored Chunk A 202 will not be performed, but to show that Chunk A 202 has been referred to multiple times, the reference counter 226 is increased. In contrast, if a chunk stored in the container 212 is deleted due to the deletion of a content, the reference counter 226 of the table 227 is reduced corresponding to the deleted number of chunks.

Next, we will describe the chunk-container table 127. The chunk-container table 127 is a table for performing index management of the container management table 128. The respective information of the FP 221, the container ID 224 and the node ID 225 registered in the container management table 128 are respectively stored in an FP field 231, a container ID field 232 and a node ID field 233 of the chunk-container table 127. A portion of the entries stored in the container management table 128 is stored in the chunk-container table 127 with the aim to perform index management.

In the present embodiment, a two-step chunk management method using the chunk-container table 127 and the container management table 128 is adopted, but the present invention is not restricted to this method, and it can be similarly applied to a single-step management method. It can also adopt a chunk management method having three or more steps.

Next, we will describe the content management table 129. Information showing which chunks constitute a content, that is, information showing which chunks cut out from a content is stored in which container, is stored in the content management table 129. The content management table 129 is provided for each content, and each entry of the content management table 129 stores information related to each chunk cut out from the present content. Each content management table identifies a content using a content ID 241. Further, each entry stores the following field information.

A content offset field 242 stores the number of bytes of a chunk from the beginning of the content. A length field 243 stores the number of bytes of the length of the chunk. An FP field 244 stores the FP of the chunk. A container ID field 245 stores information of the container ID 211 of the container storing the chunk. A node ID 246 stores the node ID of the node in which the container storing this chunk exists.

When the client 101/102 reads the data in the content based on the content management table 129, the deduplication process 113/115 can read respective chunks constituting the content from a corresponding container. Now, we will describe an example of storing File 1 (201) as the example of content 200 in the content management table 129. It is assumed that given information is stored as mentioned earlier in the container 119, the container management table 128 and the chunk-container table 127, and they are in states shown in FIG. 2.

Entry 247, entry 248 and entry 249 respectively store information related to Chunk A 202, Chunk B 203 and Chunk C 204. Entry 247 is taken as an example for describing the storing of information to an entry. The number of bytes of Chunk A 202 from the beginning of the content, which is "0x0000", is stored in the content offset field 242. The length field 243 stores "4 KB", which is the length of Chunk A 202. The FP of Chunk A 202, which is "0xB3E", is stored in the FP field 244. The container ID 211 of the container storing Chunk A 202, "AAA", is stored in the container ID field 245. A node ID "Node 0" of the node in which the container 212 having the container ID 211 of "AAA" is stored in the node ID field 246. A content management table 240 or the like is obtained by storing information related to Chunk B 203 and Chunk C 204 in a similar manner.

Figure 3:
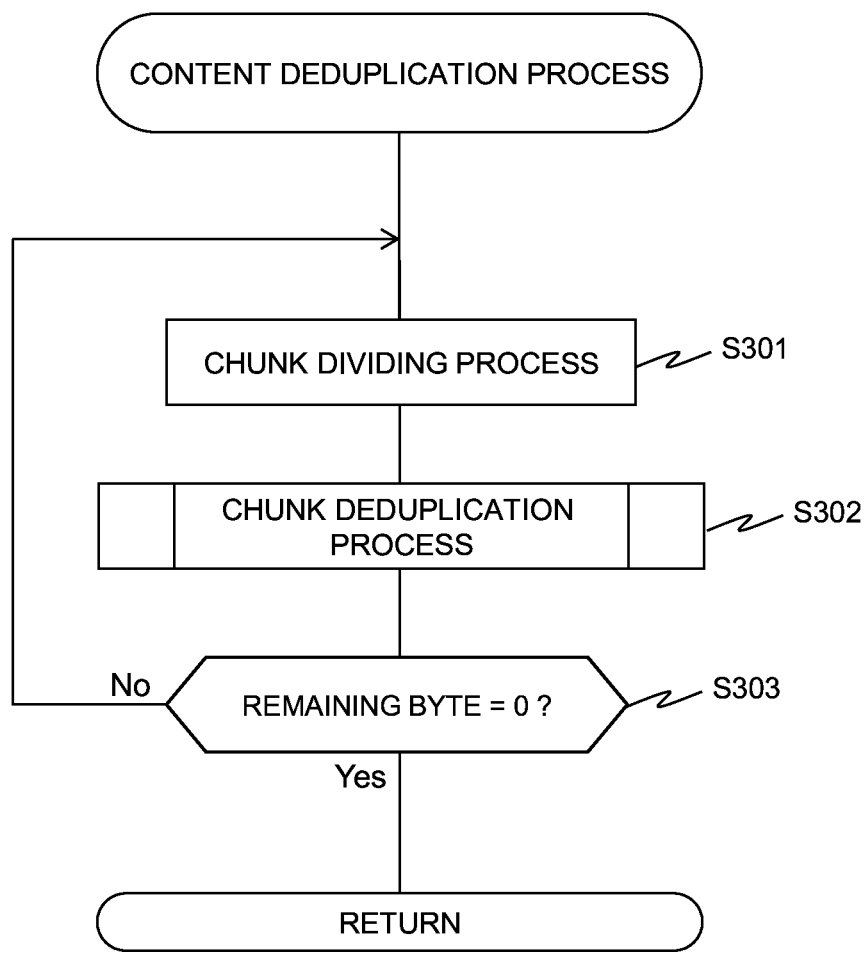
FIG. 3 is a flowchart illustrating a deduplication process of contents.

Next, we will describe the method for performing the deduplication process. FIG. 3 is a flowchart illustrating a deduplication process of a content, which is executed by the deduplication process 113/115. The timing of the deduplication process is when there is a data storage request to the storage system 106.

In S301, the deduplication process 113/115 divides a content file being the storage target into given units, and obtains a single chunk. The division can be performed via a fixed length or a variable length, and as for a file having a small size, the whole file can be handled as a single chunk without dividing the same. In S302, the deduplication process 113/115 performs a deduplication process of the chunk. The deduplication process of the chunk will be described in further detail with reference to FIG. 4.

In S303, the deduplication process 113/115 determines whether the remaining number of bytes of the storage target file is 0 or not. If the remaining number of bytes is not 0 (S303: No), the process returns to S301. The deduplication process 113/115 repeats steps S301 and S302, and when the remaining number of bytes becomes 0 (S303: Yes), it ends the deduplication process of contents. In the present process, the chunks cut out from a file are deduplicated one at a time, but it is also possible to perform deduplication of multiple number of chunks.

Figure 4:
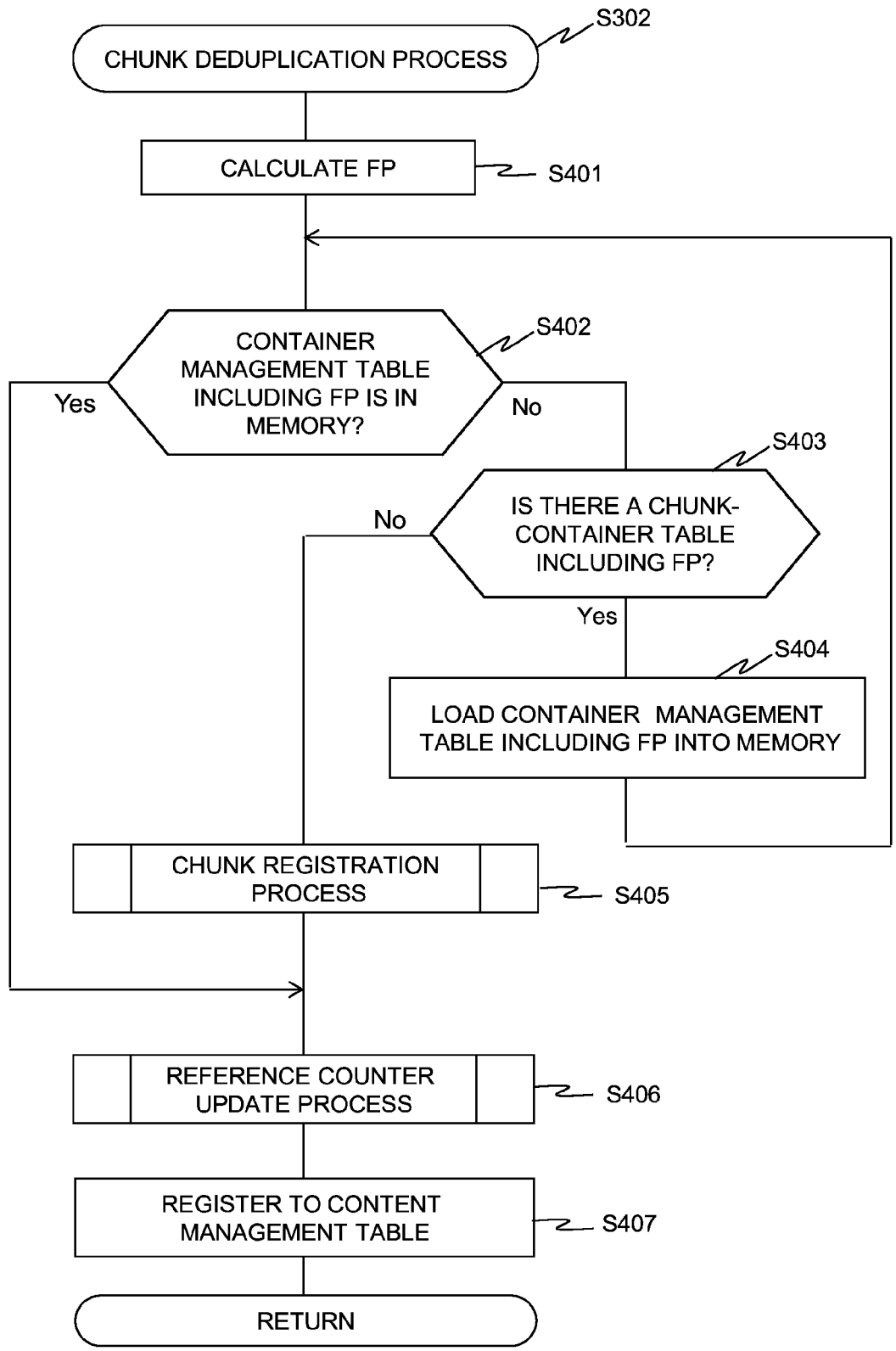
FIG. 4 is a flowchart illustrating a deduplication process of chunks.

FIG. 4 is a flowchart illustrating a deduplication process of a chunk, which is executed by the deduplication process 113/115 by a subroutine call from the above-mentioned process S302. At first, the outline of the deduplication process of the chunk will be described. The deduplication process 113/115 calculates a finger print (FP) from the chunk, and checks whether an entry including the calculated FP exists in the container management table 128 of the memory 111 or not, wherein if such entry exists, it means that deduplication has succeeded. If the container management table 128 does not exist in the memory 111, the deduplication process 113/115 utilizes the chunk-container table 127 to store the container management table 128 including the FP in the memory 111. Next, we will describe the detailed processing operation.

In S401, the deduplication process 113/115 obtains a finger print (FP) from the cut-out chunk via a hash function. A hash function is a SHA (Secure Hash Algorithm)—256 or the like, having an extremely high randomness, and it is assumed that a unique FP can be determined per chunk. That is, the deduplication process 113/115 determines that chunks having corresponding FPs are identical, and chunks having non-corresponding FPs differ.

In S402, the deduplication process 113/115 determines whether the container management table 128 including FPs exists in the memory 111 or not. When the container management table 128 including FPs exist in the memory 111 (S402: Yes), it means that a chunk is already registered, and the deduplication process 113/115 is not required to newly store the relevant chunk to the container 119/124 of the storage media 109/110. In other words, the deduplication process 113/115 has succeeded deduplication. In this case, the deduplication process 113/115 executes S406. On the other hand, if the container management table 128 including FPs do not exist in the memory 111 (S402: No), the deduplication process 113/115 executes S403.

In S403, the deduplication process 113/115 determines whether a chunk-container table 127 including FPs exist or not. If the chunk-container table 127 including FPs exist (S403: Yes), the deduplication process 113/115 executes S404. In S404, the deduplication process 113/115 refers to the node ID field 233 and the container ID field 232 of the entries including FPs in the chunk-container table 127, and loads the container management table 128 indicated by the node ID and the container ID in the memory 111. Then, the procedure returns to S402. If the container management table 128 indicated by the node ID and the container ID exists in other nodes, the above-process is executed after performing read mount again. On the other hand, if the chunk-container table 127 including FPs does not exist in S403 (S403: No), the deduplication process 113/115 executes S405.

In S405, the deduplication process 113/115 executes a chunk registration process. The present process is described in detail with reference to FIG. 5. In S406, the deduplication process 113/115 performs an update process of the reference counter 226. This is a process for incrementing the reference counter 226 of the container management table 128 corresponding to the present container, since a chunk is newly stored in the container in S405, and the details of this process will be described later. In S407, the deduplication process 113/115 performs registration to the content management table 129. The method for registering data to the content management table 129 is the same as the method for registering data to the content management table 240 of FIG. 2.

Figure 5:
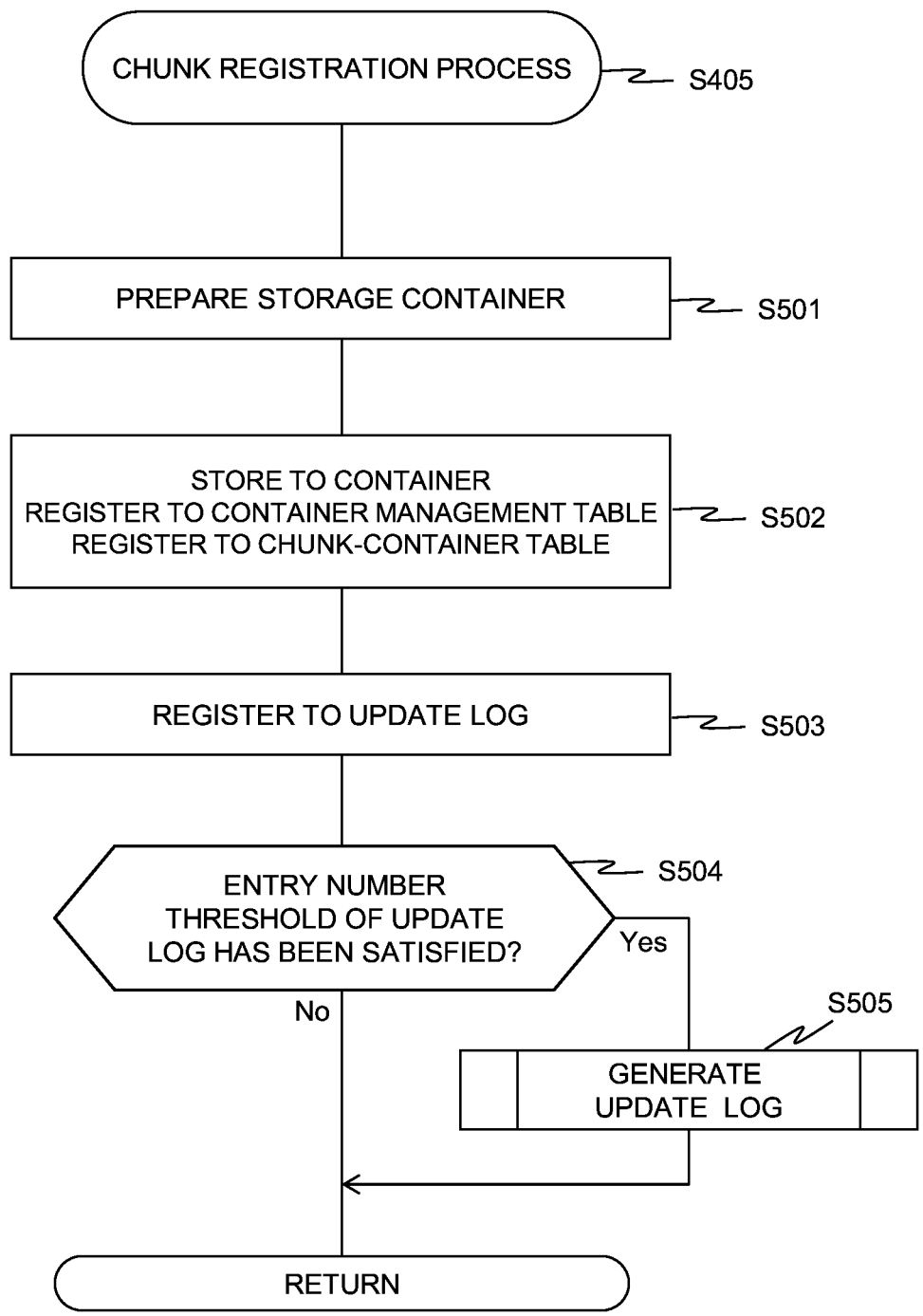
FIG. 5 is a flowchart illustrating a chunk registration process.

FIG. 5 is a flowchart illustrating a chunk registration process, which is executed by the deduplication process 113/115 based on a subroutine call from the above-mentioned process S405. In S501, the deduplication process 113/115 prepares a container 119/124 for storing the chunk.

A container is an area where multiple chunks are collectively stored, wherein the deduplication process 113/115 writes chunks up to the threshold in the memory 111, and then writes data to the storage media. Here, the generation of a container corresponds to allocating a storage area in the memory 111. It is also possible to write chunks by generating a file for a container, and in that case, preparing a container to be stored corresponds to opening a file.

In S502, the deduplication process 113/115 writes chunks to the prepared container 119/124, and also writes the corresponding management information to the corresponding container management table 128. In other words, the process determines where in the container the chunk is to be stored, and writes the offset (address) and the chunk length in entries of the corresponding container management table 128. When reading a chunk, entries are searched based on the value of the FP field 221, the container offset 222, the chunk length 223, the container ID 224 and the node ID 225 are read from the entries, and based on the read information, the corresponding chunk can be read. Furthermore, the FP of the chunk calculated in S401, the container ID 211 of the container 119/124 prepared in step S501, and the node ID in which the container exists are stored in the chunk-container table 127.

In S503, the deduplication process 113/115 registers the update contents in S502 to the deduplication information update log 117/122. Here, information related to entries newly registered to the chunk-container table 127 are registered. For example, if the container ID of the container storing the chunk having an FP of "0xB3E" is "AAA" and the container exists in "Node 0 (107)", information is registered as shown in entry 1008 of the deduplication information update log 117/122 illustrated in FIG. 10. The deduplication information update log 117/122 manages update of the deduplication information 118/123 as a log file, and includes an FP (finger print) 1003, a container ID 1004, a node ID 1005 and an update type 1006. Since these entries are newly registered in the chunk-container table 127, the deduplication process 113/115 registers "add" as the update type 1006.

In S504, the deduplication process 113/115 determines whether the number of entries in the deduplication information update log 117/122 satisfies a threshold per single file or not. If the number satisfies the threshold (S504: Yes), the deduplication process 113/115 executes S505, and generates a file for the deduplication information update log 117/122. The details of the present process will be described later. If the number does not satisfy the threshold (S504: No), the chunk registration process is ended.

Figure 6:
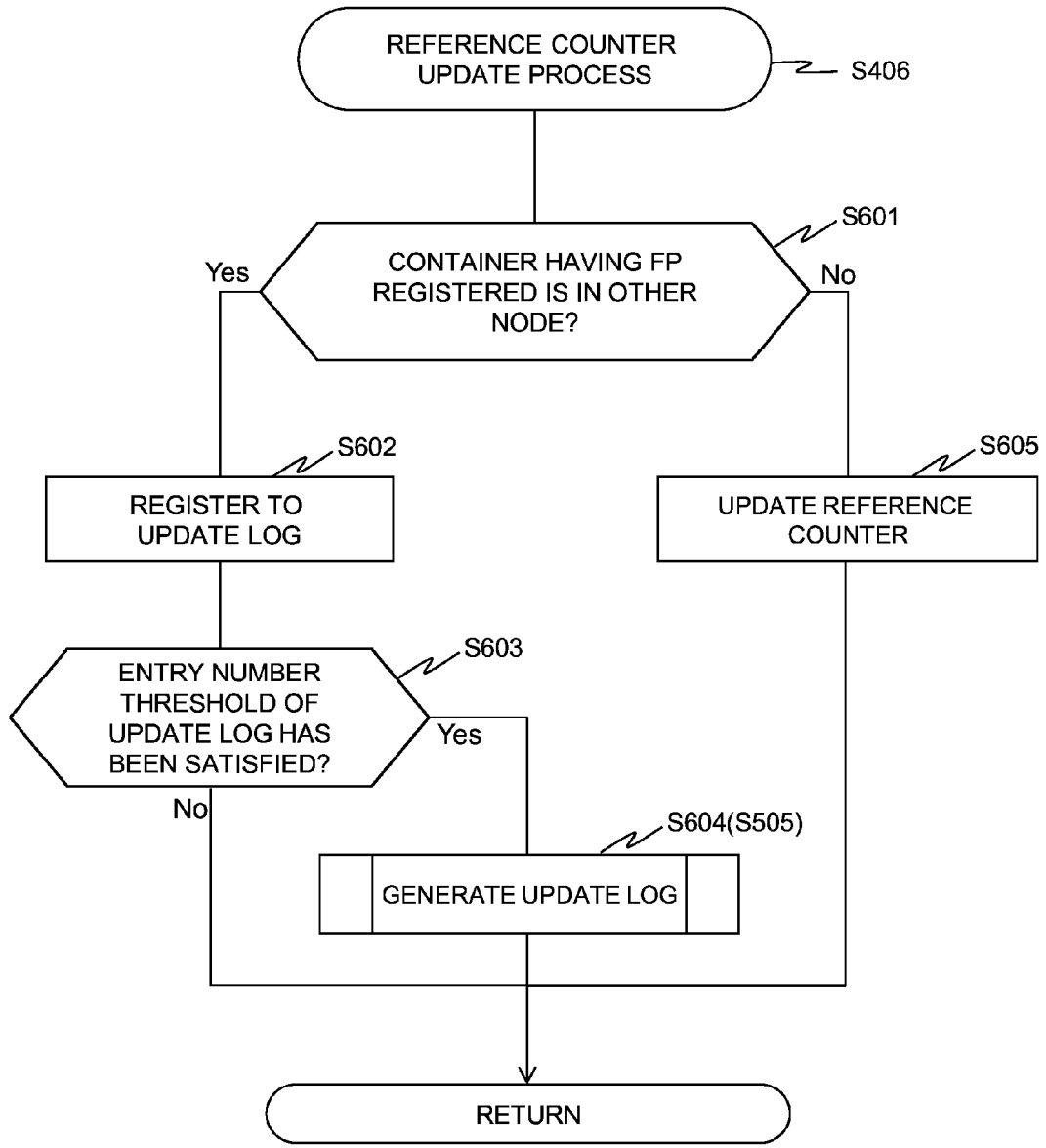
FIG. 6 is a flowchart illustrating a reference counter update process.

FIG. 6 is a flowchart illustrating a reference counter update process, which is executed by the deduplication process 113/115 based on a subroutine call from the above-mentioned process S406. At first, the outline of the reference counter update process will be described. The process differs between whether the container management table 128 in which the FP of the chunk is registered is in its own node or in another node. If the table is in its own node, the deduplication process 113/115 should simply update the reference counter 226 of the container management table 128. However, if it is in another, since the deduplication process 113/115 cannot directly update the container management table 128 in another node, it writes information in the deduplication information update log 117/122. The contents written in the deduplication information update log 117/122 is reflected later in the container management table 128 of the other node via the deduplication information reflecting thread 114/116.

In S601, the deduplication process 113/115 determines whether the container storing the chunk corresponding to the FP is in another node or not. The node ID 225 of the container management table 128 should be referred to in order to check which node the container is stored in. If the container storing the chunk corresponding to the FP is in another node (S601: Yes), the deduplication process 113/115 executes S602. On the other hand, if the container storing the chunk corresponding to the FP is in its own node (S601: No), the deduplication process 113/115 executes S605. In S605, the deduplication process 113/115 updates the reference counter 226. For example, if there is duplicated data in the own node, and when data is written from its own node to that duplicated data, the deduplication process 113/115 only updates the reference counter 226 without performing addition to the deduplication information update log 117/122.

In S602, the deduplication process 113/115 registers information to the update log. Here, the deduplication process 113/115 stores information in the deduplication information update log 117/122 indicating that the number of reference of a container in another node has increased. For example, if the number of times of reference of a container having a container ID "XXX" existing in a node having a node ID "Node 1" is increased, then "Count UP" is stored in the update type 1006 as illustrated in entry 1007 of FIG. 10. The registration timing to the deduplication information update log 117/122 is either the writing of non-duplicated data in its own node or the writing of duplicated data in another node, and the present writing is performed at the latter timing.

In S603, the deduplication process 113/115 determines whether the number of entries of the deduplication information update log 117/122 has satisfied a threshold or not. If the number of entries has satisfied a threshold (S603: Yes), the deduplication process 113/115 executes S604, closes (ends editing of) the update log being edited, and generates a file for the deduplication information update log 117/122. The present process will be described with reference to FIG. 7. If the number of entries does not satisfy the threshold (S603: No), it ends the reference counter update process.

Figure 7:
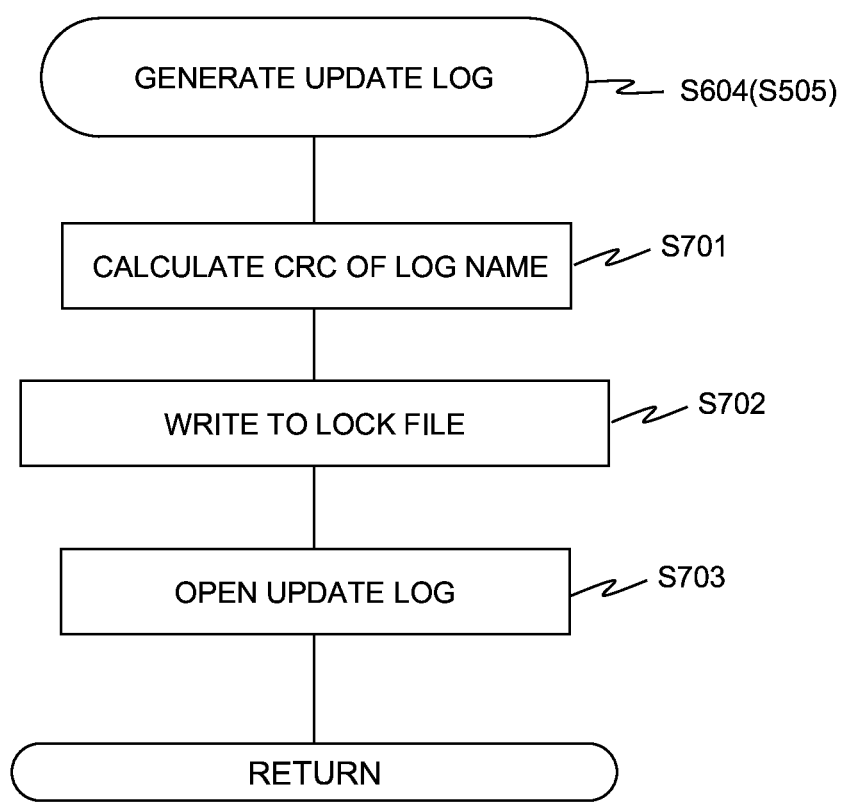
FIG. 7 is a flowchart illustrating an update log generation process.

FIG. 7 is a flowchart illustrating the update log generation process, which is executed by the deduplication process 113/115 based on the subroutine call from the above-mentioned processes S505 and S604. At first, we will describe the object of the update log generation process. In the present embodiment, when there is an update in the chunk-container table 127 of its own node or if there is a change in the reference to the container management table 128 in another node, the deduplication process 113/115 in each node adds information to the deduplication information update log 117/122. Further, the deduplication information reflecting thread 114/116 reflects a deduplication management information update log 117/122 of another node in the chunk-container table 127 and the container management table 128 of its own node. Therefore, an exclusive control is required to prevent the deduplication information update log 117/122 being edited from being read by another deduplication information reflecting thread 114/116.

Therefore, according to the present embodiment, the name of the file being edited is written in the lock file 121/126, so as to identify the file being edited. Further, in order to determine whether writing to the lock file 121/126 has been correctly performed, it utilizes a data verification code such as a CRC (Cyclic Redundancy Check). The CRC is a conventional method for verifying whether data has been correctly transmitted, by comparing the CRC codes before and after transmission (writing and reading) of data.

The above-mentioned method for utilizing lock files and CRCs is merely an example of the control method.

Figure 11:
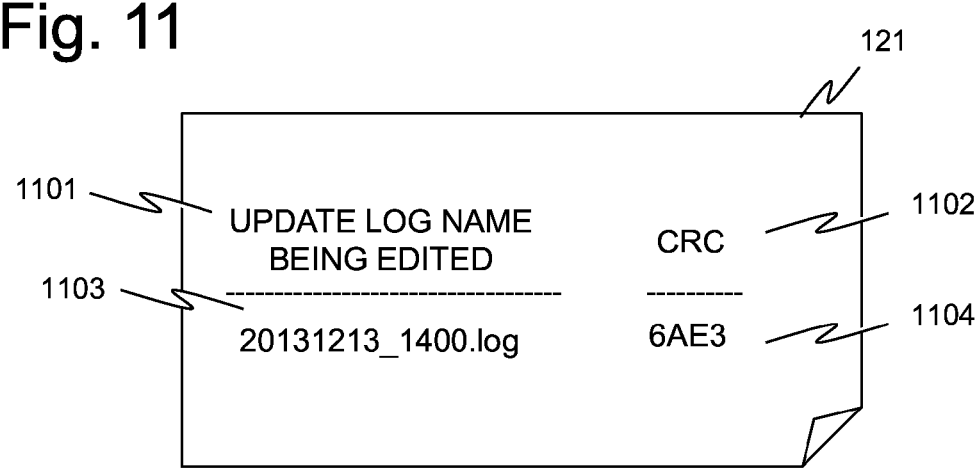
FIG. 11 is a data configuration diagram of a lock file.

In S701, the deduplication process 113/115 calculates the CRC code of the deduplication information update log name to be edited thereafter. In S702, the deduplication process 113/115 writes data to the lock file 121/126. An example of a lock file 121 is shown in FIG. 11. As described, the deduplication process 113/115 writes a deduplication information update log name 1101 to be subjected to editing and a CRC code 1102 calculated in S701. For example, if the update log name is "20131213_1400.log" and the CRC code thereof is "6AE3", the deduplication process 113/115 writes data as shown in FIG. 11. The format of the update log name is, for example in the case of "20131213_1400.log", "2013" indicates year, "1213" indicates month and date, and "1400" indicates update time (or file generation time). By adopting this format, it can be immediately determined when the update log has been updated (or generated).

In S703, the deduplication process 113/115 opens (starts editing of) the deduplication information update log 117/122 of the file name written to the lock file 121/126 in S702. As described by the process of FIG. 7, the deduplication information reflecting thread 114/116 can specify the deduplication information update log 117/122 to be edited, and can identify the update log being edited. Thereby, it becomes possible to prevent the deduplication information update log 117/122 being edited from being read by the deduplication information reflecting thread 114/116, and abnormal update or deleting of the contents of the file data can be prevented.

Figure 8:
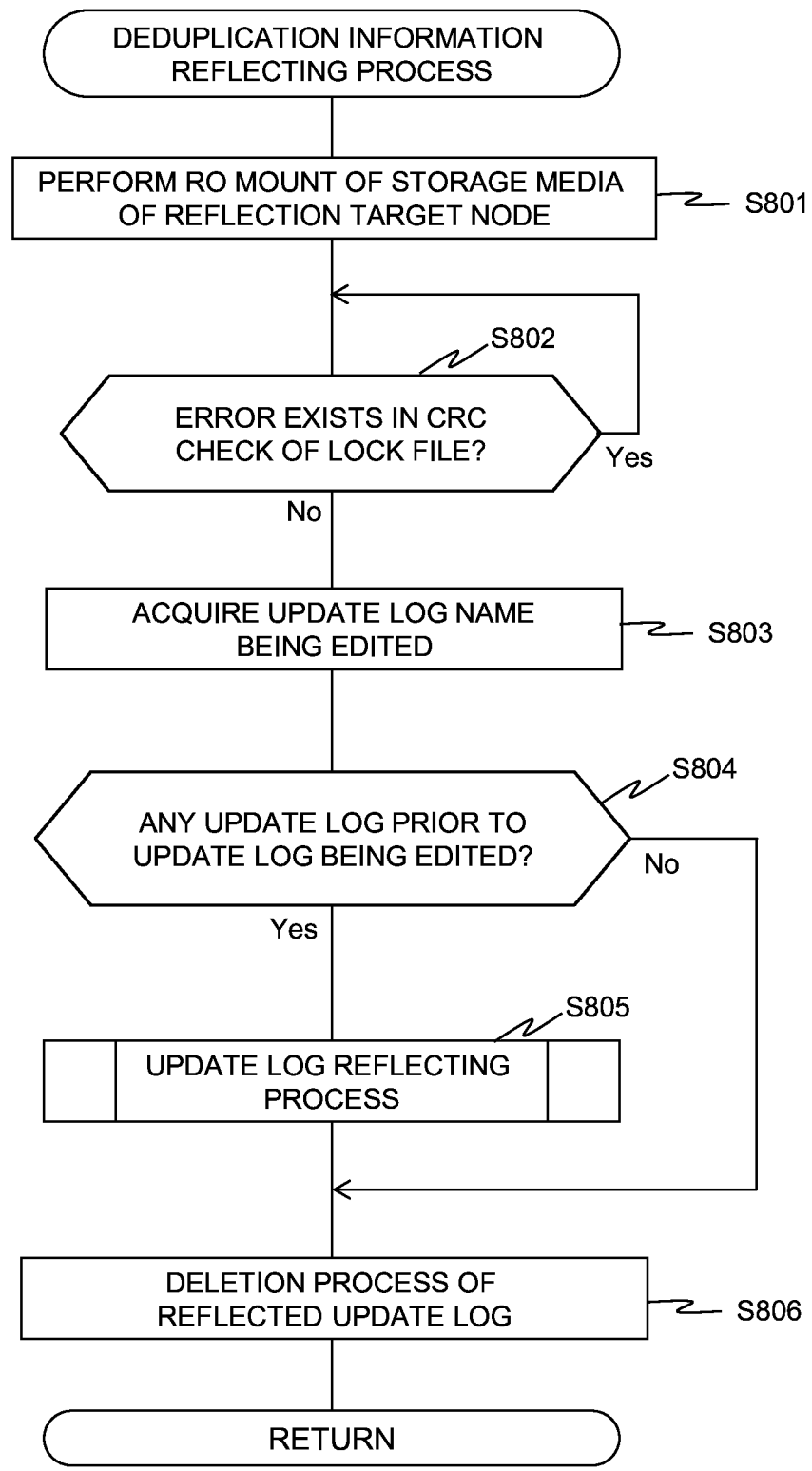
FIG. 8 is a flowchart illustrating a deduplication information reflecting process.

Next, the deduplication information reflecting process will be described with reference to FIG. 8. The deduplication information reflecting process is a process executed by the deduplication information reflecting thread 114/116, which is executed at a different timing as the aforementioned content storage process (deduplication process). The timing thereof can be, for example, periodically via a scheduler or the like, or when a storage capacity or the number of times of storage of content data to a storage media in the own node has exceeded a given threshold. FIG. 8 is a flowchart illustrating a deduplication information reflecting process. In the present embodiment, the storage media in another node is subjected to read-mount to acquire the information of another node, but other methods can be adopted, such as NFS mount of use of the network.

In S801, the deduplication information reflecting thread 114/116 performs a read-only (RO) mount of the storage media of the node being the target of reflecting deduplication information. In S802, the deduplication information reflecting thread 114/116 executes the CRC check of the lock file 121/126. That is, it calculates the CRC code of the deduplication information update log name 1101 being edited stored in the lock file 121/126, and examines whether it corresponds to a CRC code 1102 stored in the lock file 121/126.

This is to determine whether the deduplication information update log name stored in the lock file 121/126 is proper or not, and to prevent the acquisition of an erroneous update log, as described in the object of the process of FIG. 7. When the CRC codes correspond, it is determined that there is no error (S802: No), and the deduplication information reflecting thread 114/116 executes S803. On the other hand, if the CRC codes do not correspond, the deduplication information reflecting thread 114/116 determines that there is an error (S802: Yes), and performs the CRC check again. If errors continue even after the elapse of a given time, the deduplication information reflecting thread 114/116 ends the deduplication information reflecting process.

Figure 10:
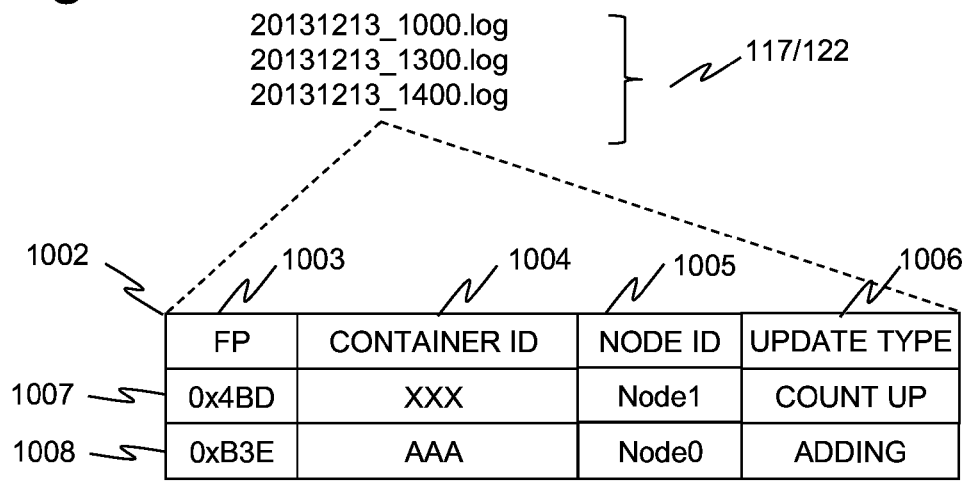
FIG. 10 is a data configuration diagram of a deduplication information update log.

In S803, the deduplication information reflecting thread 114/116 acquires the update log name of the deduplication information being edited. This can be realized by acquiring the information of an update log name 1101 of the deduplication information being edited stored in the lock file 121/126. In S804, the deduplication information reflecting thread 114/116 determines whether or not there is an update log prior to the update log of the deduplication information being edited. If there is an update log prior to edition (S804: Yes), the deduplication information reflecting thread 114/116 executes S805. If there is no update log prior to edition (S804: No), the deduplication information reflecting thread 114/116 executes S806. For example, if the update log group and the lock file are as shown in FIGS. 10 and 11, the update log being currently edited is "20131213_1400.log" stored in the lock file 121, and the update log prior thereto are "20131213_1000.log" and "20131213_1300.log".

Figure 12:
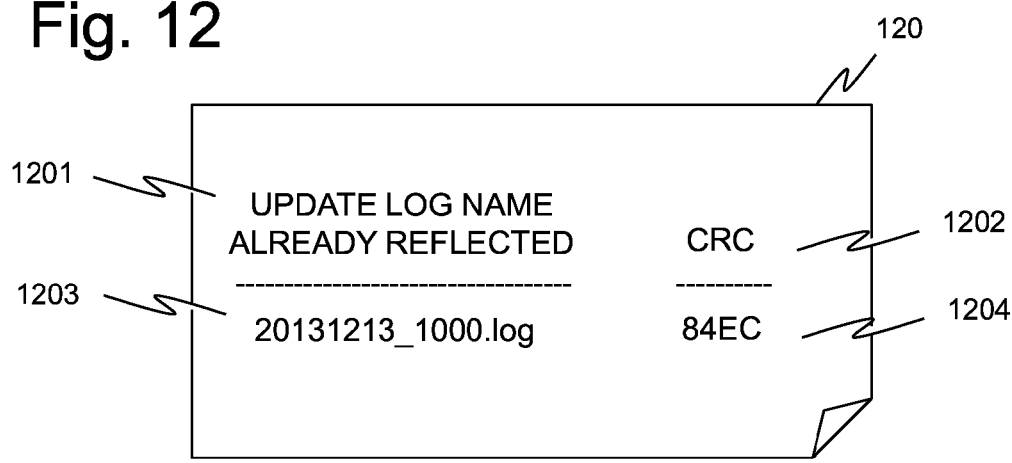
FIG. 12 is a data configuration diagram of a log acquisition list.

In S805, the deduplication information reflecting thread 114/116 performs a reflection process of the deduplication information update log 117/122. The present process will be described in detail with reference to FIG. 9. In S806, the deduplication information reflecting thread 114/116 deletes the log that is already reflected in another node out of the deduplication information update log 117/122 in its own node. Actually, the deduplication information reflecting thread 114/116 confirms the log acquisition list 120/125 of another node, and if a log file name is written therein, it deletes the update log of its own node. The log acquisition list 120/125 includes a reflected update log name 1201 and a CRC 1202, as shown in FIG. 12. In the example of FIG. 12, an update log of "20131213_1000.log" is already reflected in the deduplication information 118/123 of another node. Therefore, the deduplication information reflecting thread 114/116 deletes the corresponding file "20131213_1000.log" in the deduplication information update log 117/122 of its own node.

For example, the deduplication information reflecting thread 0 (114) confirms a log acquisition list 125 of Node 1 (108), and determines whether to delete the deduplication information update log 117. In order to determine whether the information stored in the log acquisition list 120/125 is correct or not, a CRC check is performed in a similar manner as described earlier. The process of S806 is independent from the process of S802 to S805, but by executing the process successively via a read mount status, the unmounting and re-read-mounting processes can be omitted, and the speed of the process can be increased. Of course, the process of S806 can be executed at a different timing.

Figure 9:
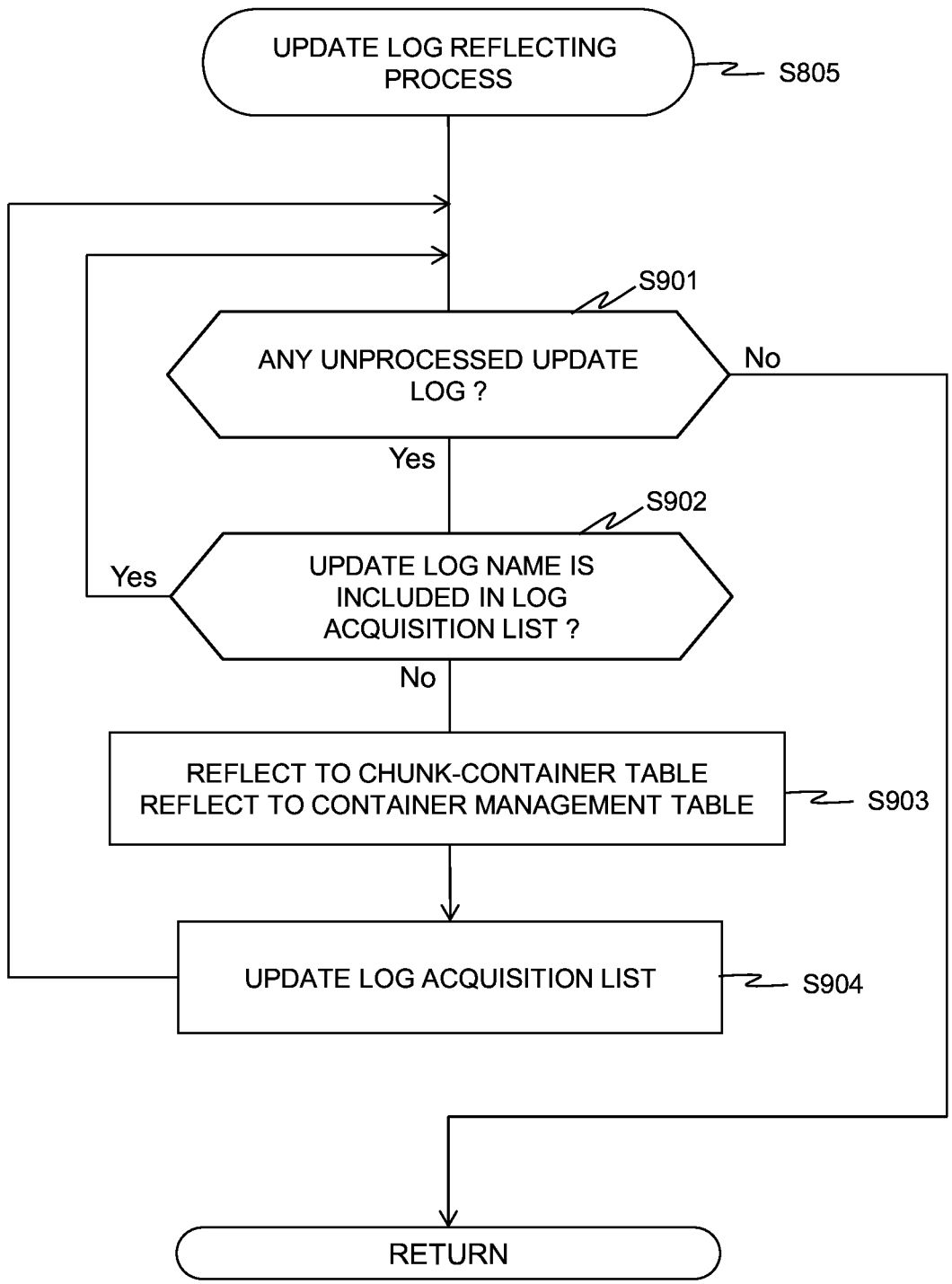
FIG. 9 is a flowchart illustrating an update log reflection process.

FIG. 9 is a flowchart illustrating an update log reflection process, which is executed by the deduplication information reflecting thread 114/116 via a subroutine call from the above-described process S805. In S901, the deduplication information reflecting thread 114/116 determines whether there is an unprocessed deduplication information update log 117/122 (such as "20131213_1300.log") or not. If there is an unprocessed update log (S901: Yes), the deduplication information reflecting thread 114/116 executes S902. If there is no unprocessed update log (S901: No), the deduplication information reflecting thread 114/116 ends the update log reflection process.

In S902, the deduplication information reflecting thread 114/116 determines whether the deduplication information update log 117/122 is included in the log acquisition list 120/125 of its own node. If it is included in the log acquisition list 120/125, it means that the deduplication information update log is already updated and there is no more need to update the same, so that the deduplication information reflecting thread 114/116 executes S901 again and determines whether a non-processed deduplication information update log exists or not. If it is not included in the log acquisition list 120/125, the deduplication information reflecting thread 114/116 executes S903. For example, a deduplication information reflecting thread 1 (116) determines whether a deduplication information update log 117 of Node 0 (107) is included in a log acquisition list 125 of its own node. In the example illustrated in FIGS. 10 through 12, it can be seen that the deduplication information update log which is not yet processed and not included in the log acquisition list is "20131213_1300.log".

In S903, the deduplication information reflecting thread 114/116 performs a reflecting process to the chunk-container table 127 and to the container management table 128. Now, with reference to FIGS. 13 and 14, the operation example of the present update log reflection process will be described. As an example of the deduplication information update log 117/122, a deduplication information update log 1002 illustrated in FIG. 10 is used. Further, it is assumed that the present deduplication information update log 1002 exists in Node 0 (107).

Figure 13:
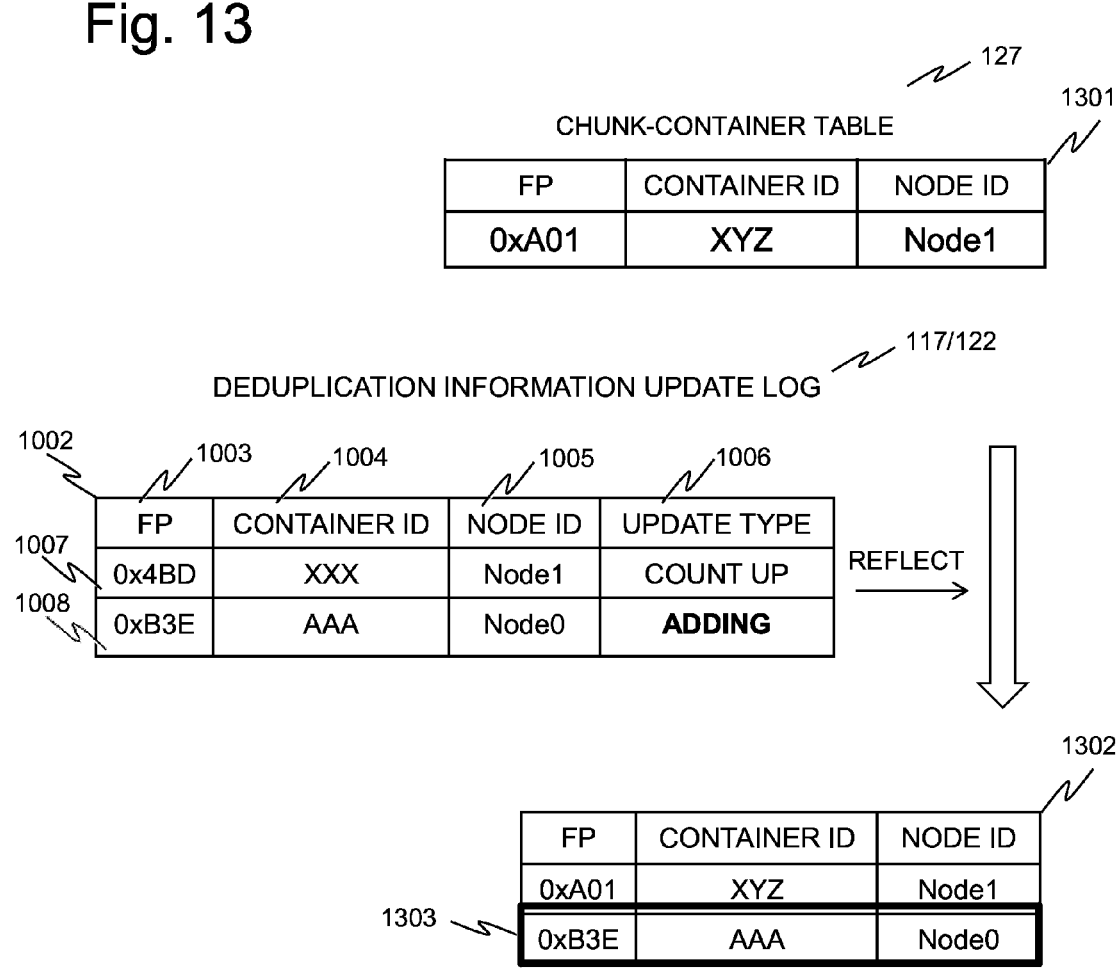
FIG. 13 is a view illustrating an update log reflecting operation to a chunk-container table.

At first, FIG. 13 illustrates an update log reflecting operation performed to the chunk-container table 127 (table 1301), so the present drawing will be described. Since an entry 1008 of the deduplication information update log 1002 has "add" registered in the update type 1006, the deduplication information reflecting thread 1 (116) recognizes that the entry is a content to be reflected in the chunk-container table 127. Further, if "delete" is registered in the update type 1006, that entry is a content to be reflected to the chunk-container table 127.

The deduplication information reflecting thread 1 (116) adds the FP 1003 "0xB3E", the container ID 1004 "AAA" and the node ID 1005 "Node 0" of entry 1008 to an entry 1303 of the chunk-container table 127 (table 1301), and updates the same as shown in table 1302. When applying the present invention to a cluster composed of three or more nodes, the above-mentioned reflection is performed when the entry has a node ID of its own node stored in the node ID 1005. For example, if it is assumed that the own node is Node 1, and that there is an entry related to Node 1 and Node 2 (not shown) in Node 0, the deduplication information reflecting thread 1 (116) reflects only the entry related to Node 1 to the chunk-container table 127 of its own node.

Figure 14:
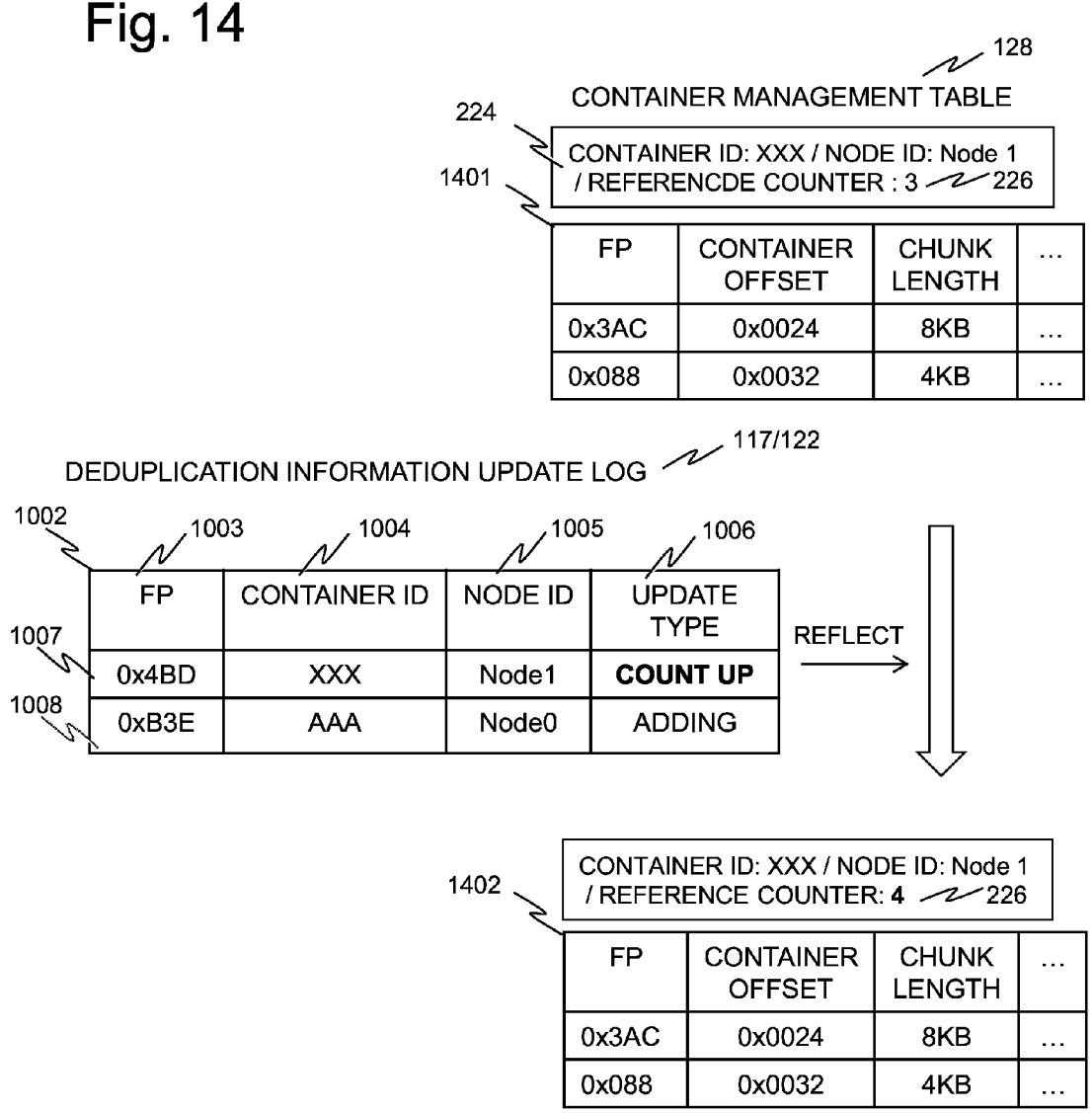
FIG. 14 is a view illustrating an update log reflecting operation to a container management table.

Next, FIG. 14 illustrates an update log reflecting operation regarding the container management table 128. Since "Count UP" (increment of reference counter) is registered in the update type 1006 of entry 1007 of the deduplication information update log 1002, it is determined that the entry is a content to be reflected in the container management table 128. Further, when "Count DOWN" (decrement of reference counter) is registered in the update type 1006, it means that the content should be reflected in the container management table 128.

Since the container ID 1004 of the entry 1007 is "XXX" in the deduplication information reflecting thread 1 (116), "+1" is added to the value of the reference counter 226 in a container management table 1401 having "XXX" as the container ID 224, so that the table is updated as shown in the container management table 1402. When the present invention is applied to a cluster composed of three or more nodes, the above-described update is performed only regarding an entry where the node ID 1005 shows its own node ID. As described, according to the present embodiment, a node ID field 1005 is provided to show which node the invention should be reflected to, and update logs can be generated for each reflection destination node for distinguishing the same. The description of the process example of S903 is completed, so we will return to the description of FIG. 9.

In S904, the deduplication information reflecting thread 114/116 writes the file name of the deduplication information update log 117/122 reflected from the other node to the to the log acquisition list 120/125 of its own node, and performs update. For example, if the deduplication information update log 117 of Node 0 is reflected in Node 1 (108) by the deduplication information reflecting thread 1 (116), the deduplication information reflecting thread 1 (116) adds a file name and a CRC code of the deduplication information update log 117 to a log acquisition list 125.

Figure 15:
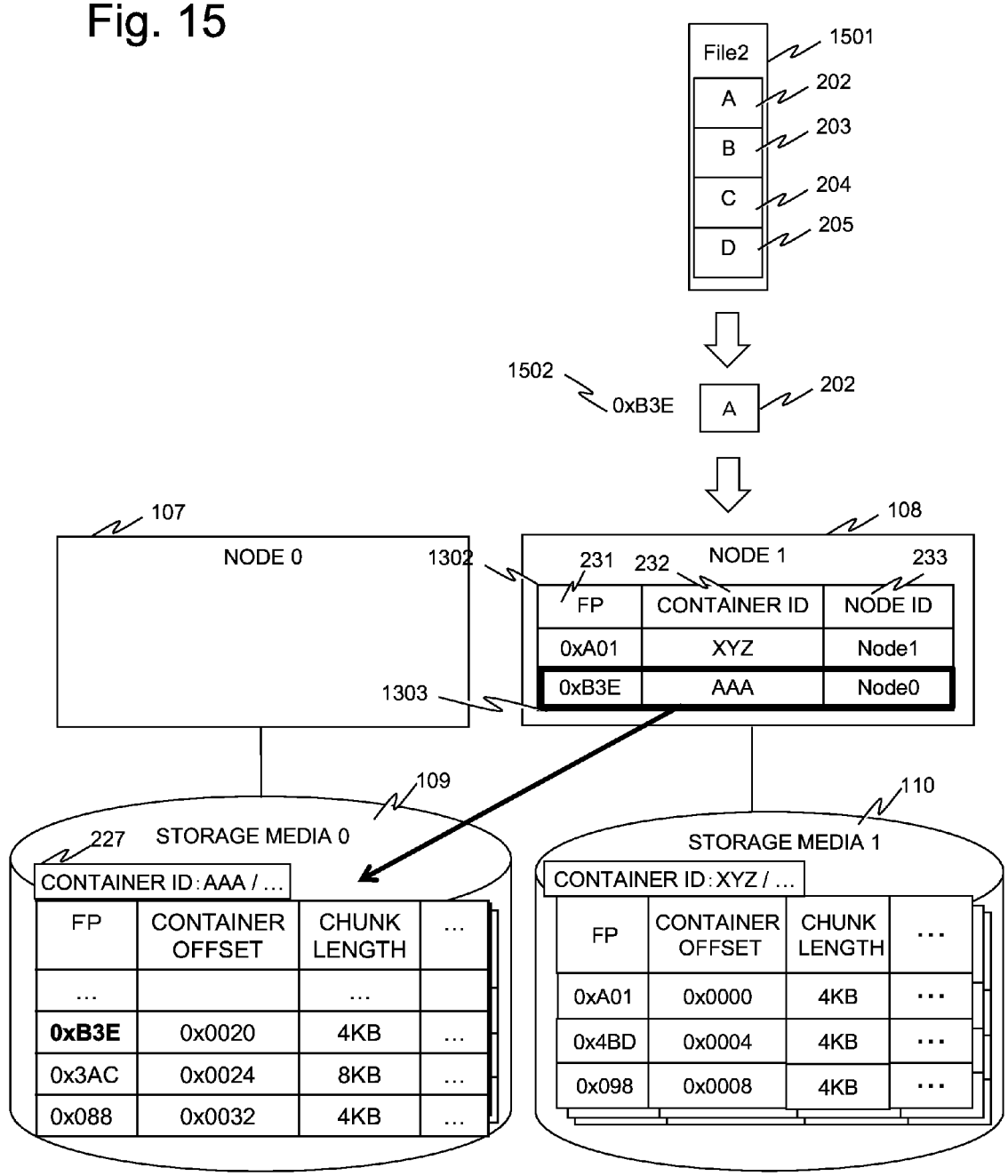
FIG. 15 is a deduplication process among nodes.

Next, the actual node-to-node deduplication operation will be described with reference to FIG. 15. FIG. 15 illustrates an example of the deduplication process performed between nodes, and the following statuses (1) through (4) are assumed. In FIG. 15, the memory 111 and the processor 112 are not shown.

(1) As shown in FIG. 2, File 1 (201) composed of Chunk A, Chunk B and Chunk C are already stored in storage media 109 of Node 0 (107). The container ID of the container 119 storing the above-mentioned chunk group and the container management table 128 is "AAA", and information is registered as shown in the container 212 and the container management table 227 of FIG. 2.

(2) FIG. 2 (1501) is composed of Chunk A 202, Chunk B 203, Chunk C 204, and Chunk D 205.

(3) The chunk-container table 127 is in the state as shown in reference number 1302 (FIG. 13) by the deduplication information reflecting thread 1 (116).

(4) The processes up to S403 are completed in the chunk deduplication process S302 (FIG. 4).

The FP of chunk A 202 which is the first chunk of File 2 (1501) is "0xB3E" (reference number 1502), and since an entry 1303 including the present FP exists in the chunk-container table 127 (S403: Yes), the deduplication process 1 (115) executes S404. In S404, the deduplication process 1 (115) stores the container management table 128 including the FP of the chunk in the memory 111 of the Node 1 (108). That is, the deduplication process 1 (115) refers to the node ID field 233 and the container ID field 232 of entry 1303 of the chunk-container table 127, and stores the corresponding container management table 128 in the memory 111 of Node 1 (108). Here, since the node ID field 233 is "Node 0" and the container ID field 232 is "AAA", the deduplication process 1 (115) acquires the container management table 227 where the container ID is "AAA" from Node 0, and stores the same in the memory 111 of Node 1 (108).

Next, the deduplication process 1 (115) executes the process of S402 again. Since the container management table 128 (1302) including FP "0xB3E" of Chunk A 202 exists in the memory 111 of Node 1 (108) (S402: Yes), the deduplication process 1 (115) executes S406. In S406, the deduplication process 1 (115) executes the reference counter update process S406 of FIG. 6. In S601, since "Node 0" is registered in the node ID 225 of the container management table 227 having FP "0xB3E" of Chunk A 202 registered thereto, the deduplication process 1 (115) determines that a container in which the FP is registered exists in other nodes (S601: Yes), and executes S602.

In S602, the deduplication process 1 (115) registers data to the deduplication information update log 122 (table 1002) of Node 1. That is, the deduplication process 1 (115) registers the FP "0xB3E" (reference number 1502) of Chunk A 202 in the FP field 1003. Further, the deduplication process 1 (115) registers container ID 224 "AAA" to a container ID field 1004 in the container management table 227 being referred to and stored in the memory 111. Further, the deduplication process 1 (115) stores "Node 0" as the ode ID storing the container management table 227 in the node ID field 1005, and registers "Count UP" in the update type field 1006.

In S407, the deduplication process 1 (115) registers data to the content management table 129. The present registration method is already described with reference to FIG. 2, so the description thereof is omitted. The same process is performed to Chunk B 203 and the subsequent chunks. Based on the process of S404, the container management table 227 storing information corresponding to Chunk A 202, Chunk B 203 and Chunk C 204 exists in the memory 111 of Node 1. Further, since Chunk D 205 neither exists in Node 0 (107) nor Node 1 (108), the deduplication process 1 (115) executes a chunk registration process (S405) to Node 1 (108).

As described above, according to the cluster configuration storage subsystem of the present embodiment, since the deduplication information related to the chunk stored in other nodes is also reflected in the own node, when a content storage request to its own node is received from a superior device, duplicated chunks can be specified even throughout the cluster nodes, so that only non-duplicated chunks can be stored in its own node, according to which the deduplication rate can be improved. Further, since deduplication information of other nodes is acquired periodically to monitor whether update has occurred or not, and when it is determined that update has occurred, the update information can be reflected in the deduplication information of its own node and communication between nodes is not required, so that high-speed deduplication among nodes can be realized. The acquisition of a deduplication information update log of the other node and the reflection of the same to the deduplication information of its own node can also be determined to be executed when the content data storage capacity to the storage media of its own node exceeds a given threshold.

Figure 16:
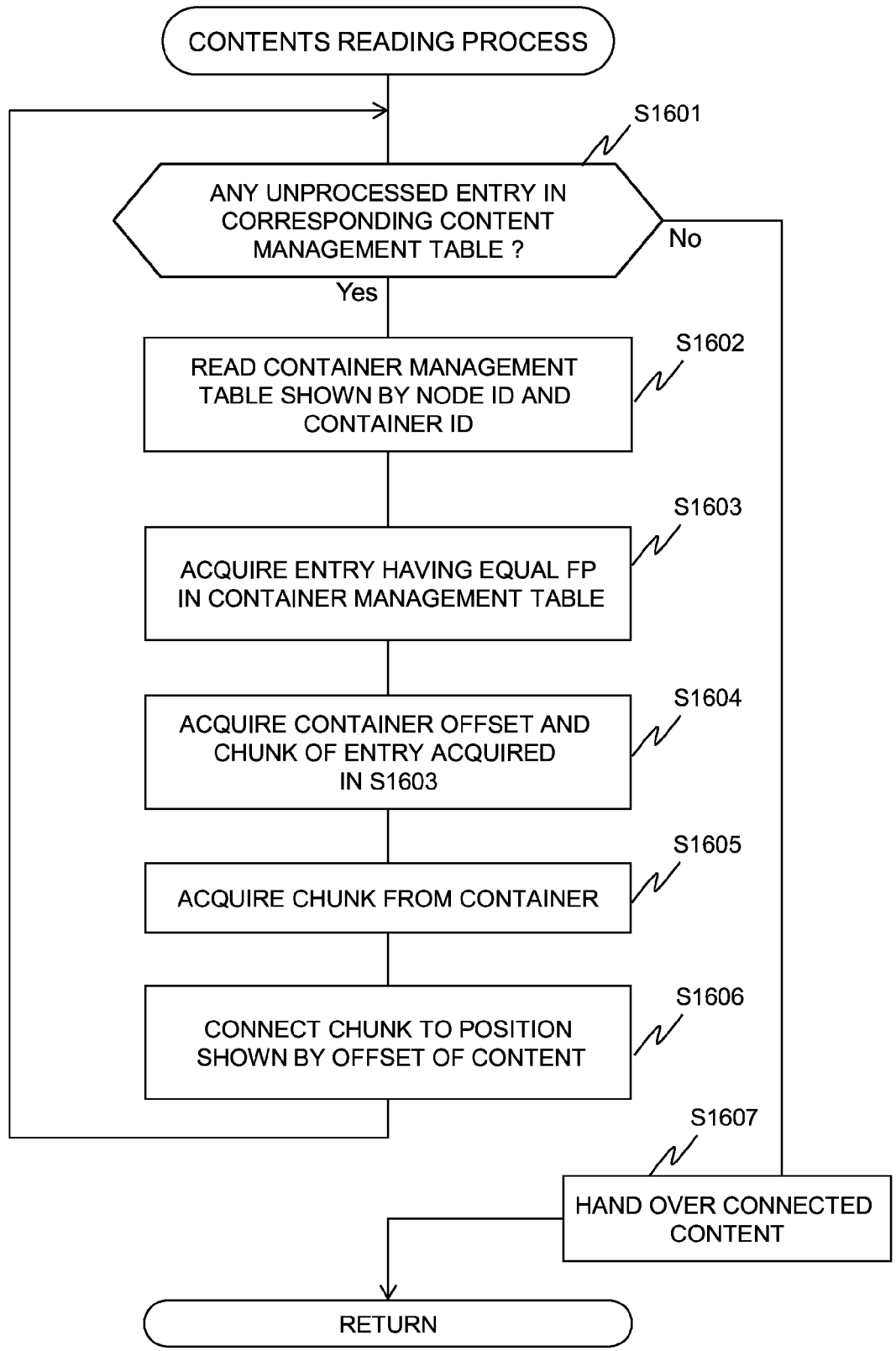
FIG. 16 is a flowchart illustrating a content reading process.

Next, we will describe a content read process and a content deletion process. FIG. 16 is a flowchart illustrating the content read process. The present process is executed at a timing when the storage system 106 receives a content read request from the client 101/102. In the present embodiment, the content read process is executed by the deduplication process 113/115, but it can also be executed via another process or a thread.

In S1601, the deduplication process 113/115 determines whether there is an unprocessed entry (entry to be processed) in the relevant content management table 129. For example, when reading File 1 (201), the table 240 having a content ID 241 of "File 1" (201) is relevant, and the entries to be processed are entry 247 (information of Chunk A)/entry 248 (information of Chunk B)/entry 249 (information of Chunk C). In the case where the content ID 241 is "File 2" (1501), the entry information of Chunk D is included in the entry to be processed. When there is an unprocessed entry (S1601: Yes), the deduplication process 113/115 executes S1602. When there is no unprocessed entry (S1601: No), the deduplication process 113/115 executes S1607.

In S1602, the deduplication process 113/115 extracts one entry determined as unprocessed in S1601, and reads the container management table 128 indicated by the node ID 246 and the container ID 245. For example, in entry 247, since the container ID 245 is "AAA" and the node ID 246 is "Node 0", the deduplication process 113/115 reads the container management table 128 where the container ID 224 in Node 0 is "AAA". At that time, if the container management table 128 is in another node (Node 1), reading is performed after performing read-mount of the storage media 109/110 of the other node.

In S1603, the deduplication process 113/115 acquires an entry equal to the FP field 244 of the entry being processed by the FP field 221 in the container management table 128 being read in S1602. For example, in entry 247, the value of the FP field 244 is "0xB3E", so the deduplication process 113/115 acquires entry 228 of the container management table 227. In S1604, the deduplication process 113/115 acquires the container offset 222 and the chunk length 223 of the entry acquired in S1603. For example, in entry 228, the deduplication process 113/115 acquires "0x0020" as the container offset 222 and "4 KB" as the chunk length 223.

In S1605, the deduplication process 113/115 acquires the chunk indicated by the container offset and the chunk length acquired in S1604 from the containers shown by the container ID 245 and the node ID 246 of the entry being processed. For example, in entry 247, the deduplication process 113/115 acquires chunks corresponding to "4 KB" from the offset "0x0020" position from the container 212 where the container ID of Node 0 is "AAA". In S1606, the deduplication process 113/115 connects the chunks acquired in S1605 to the position shown by the offset 242 of the content of the content management table 129. Thereafter, the deduplication process 113/115 executes S1601 again, and repeats the above process until there is no more unprocessed entry.

When there is no more unprocessed entry (S1601: No), the deduplication process 113/115 executes S1607, transmits the content connected with the chunks to the client 101/102, and ends the content reading process. If the content ID 241 is "File 1" (201), Chunk A, Chunk B and Chunk C are read from the storage media 0 (109) and connected. Further, if the content ID 241 is "File 2" (1501), the deduplication process 113/115 reads Chunk D from the storage media 1 (110), and connects the same to the connected Chunk A/Chunk B/Chunk C.

Figure 17:
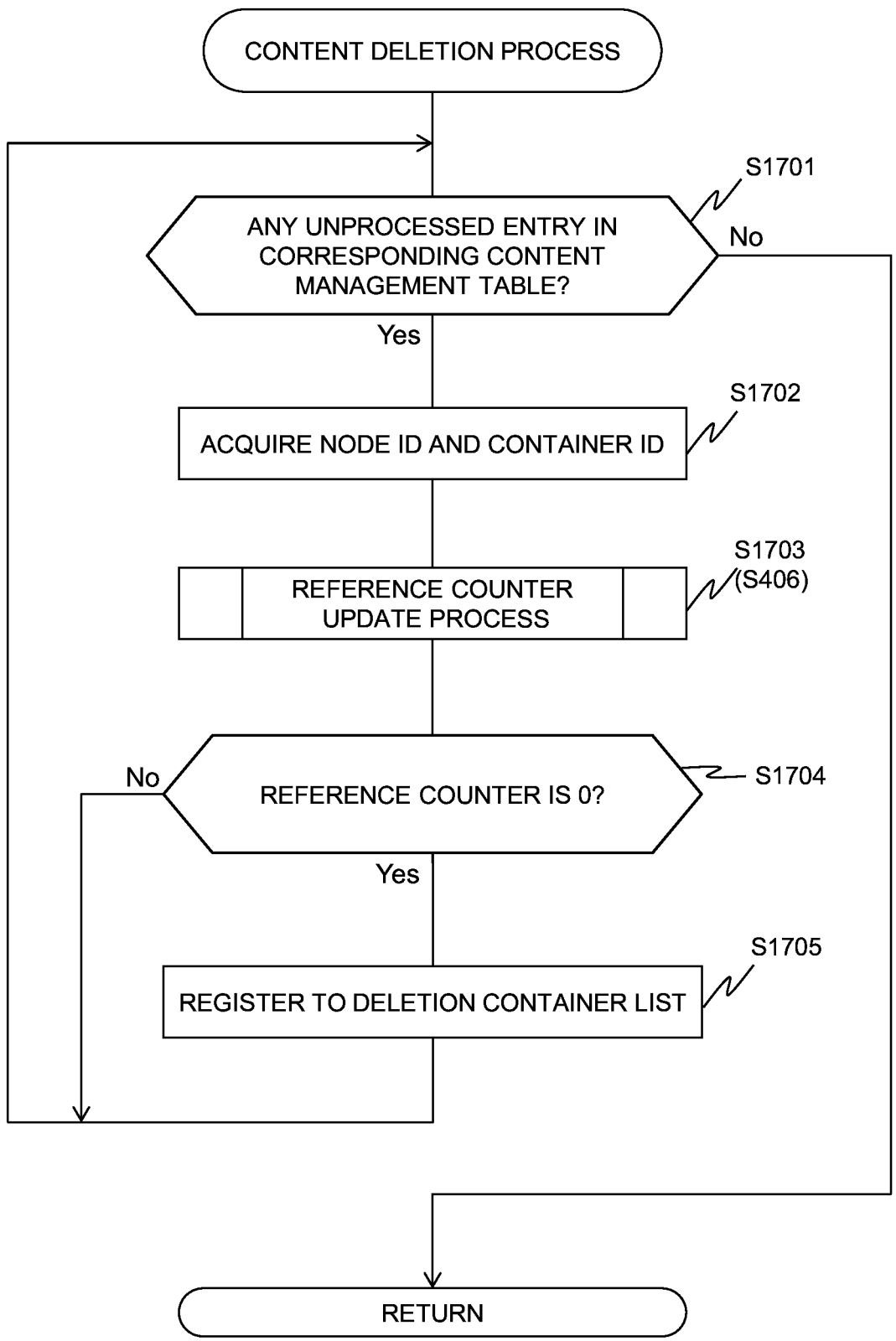
FIG. 17 is a flowchart illustrating a content deletion process.

FIG. 17 is a flowchart illustrating a content deletion process. The present process is executed by the deduplication process 113/115 at a timing when a content deleting request is received from a superior device. In S1701, the deduplication process 113/115 determines whether there is an unprocessed entry in the corresponding content management table 129. In the aforementioned content management table 240 storing information of File 1 (201), entry 247, entry 248 and entry 249 are processing target entries. If there is an unprocessed entry (S1701: Yes), the deduplication process 113/115 executes S1702. If there is no unprocessed entry (S1701: No), the deduplication process 113/115 ends the content deletion process.

In S1702, the deduplication process 113/115 refers to the node ID field 246 and the container ID field 245 of the content management table 129, and acquires a node ID and a container ID. In S1703, the deduplication process 113/115 performs a reference counter update process of the container management table 128 shown by the node ID and the container ID acquired in S1702. Here, the deduplication process 113/115 decrements the reference counter (Count DOWN). The present process is a process similar to S406, so the detailed descriptions thereof are omitted.

In S1704, the deduplication process 113/115 determines whether the reference counter 226 of the container management table 128 processed in S1703 is 0 or not. The present process is executed by the deduplication process 113/115 only when the container management table 128 exists in its own node. When the reference counter is 0, the deduplication process 113/115 executes S1705. If the reference counter is not 0, the deduplication process 113/115 processes S1701 again.

In S1705, the deduplication process 113/115 registers data to a deletion container list 130/131. Here, the deduplication process 113/115 writes the container ID 224 of the deletion target container where the reference counter 226 is 0 in the deletion container list 130/131. A list of deletion target container IDs are stored in the deletion container list 130/131, but it is also possible to store CRC codes at the same time, such as in the aforementioned lock file 121/126 or the log acquisition list 120/125. By also storing the CRC codes in the deletion container list 130/131, it becomes possible to verify the deletion target container ID, and to prevent wrong containers from being deleted.

Figure 18:
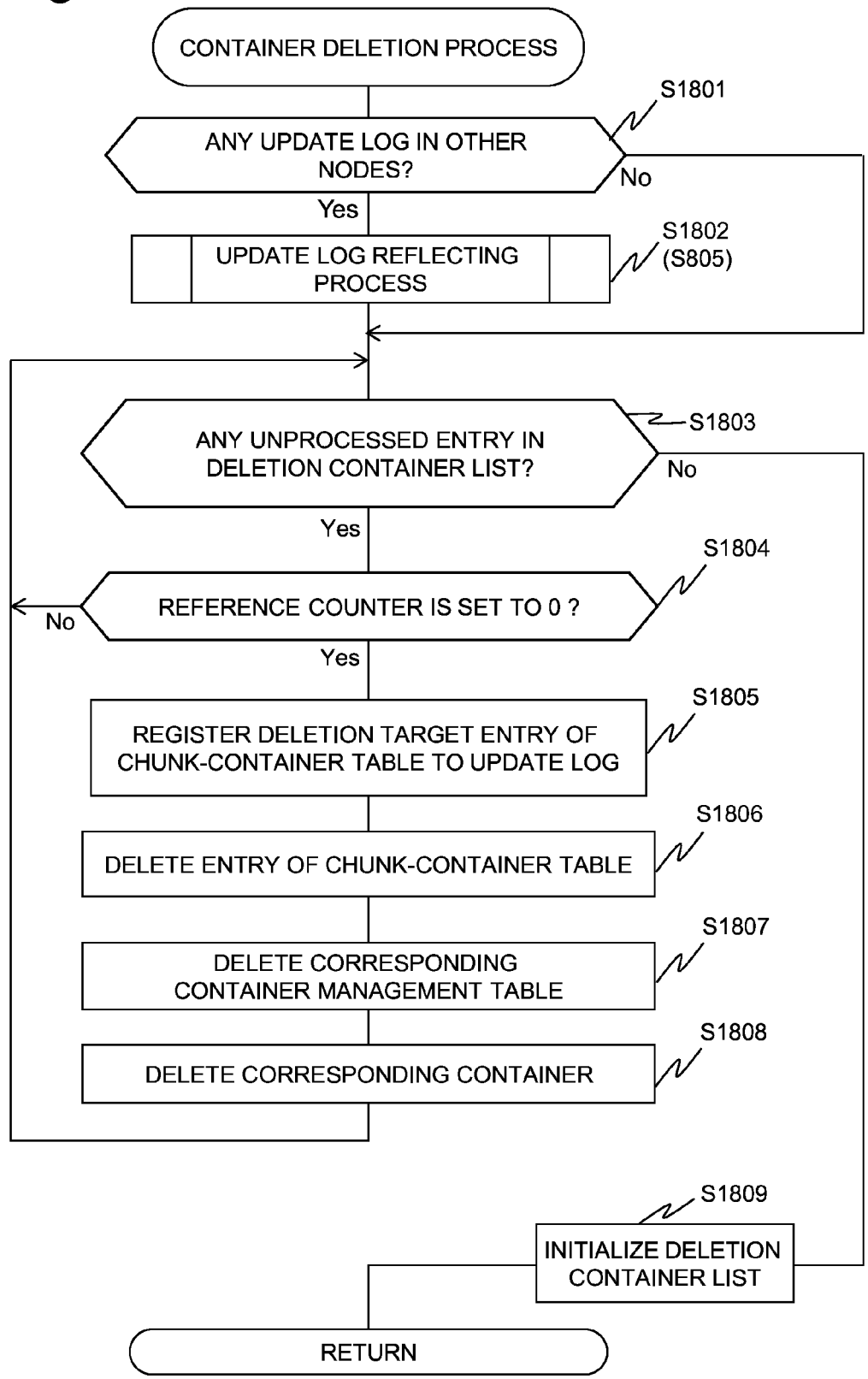
FIG. 18 is a flowchart showing a container deletion process.

FIG. 18 is a flowchart illustrating a container deletion process. The present process is a process executed by the deduplication process 113/115 for deleting the container 119/124 and the container management table 128 which are not referred to, at a timing when the content storage process are deletion process are not executed. The present embodiment is executed by the deduplication process 113/115, but it can also be executed by a different process or thread.

In S1801, the deduplication process 113/115 determines whether there is a deduplication information update log 117/122 in another node. If there is a deduplication information update log 117/122 (S1801: Yes), the deduplication process 113/115 executes S1802. If there is no deduplication information update log 117/122 (S1801: No), the deduplication process 113/115 executes S1803. S1802 is a similar process as S805, so it will not be described in detail here. Processes S1801 and S1802 are pre-processes for executing container deletion, wherein the deduplication information reflecting thread 114/116 reflects the deduplication information update log 117/122 of the other node to the deduplication information 123/118 of its own node, and updates the deduplication information 123/118 to the latest information. In the subsequent processes, whether the container management table 128 and the container 119/124 should be deleted or not is determined, and deletion is executed.

In S1803, the deduplication process 113/115 determines whether there is an unprocessed entry in the deletion container list 130/131. A deletion target container ID added in S1705 is listed in the deletion container list 130/131. If there is an unprocessed entry (S1803: Yes), the deduplication process 113/115 executes S1804. If there is no unprocessed entry (S1803: No), the deduplication process 113/115 executes S1809. In S1804, the deduplication process 113/115 extracts one of the entries determined as an unprocessed entry in S1803, and determines whether the reference counter 226 of the container management table 128 shown by that entry is 0 or not. When the reference counter 226 is 0 (S1804: Yes), the deduplication process 113/115 executes S1805. If the reference counter 226 is not 0 (S1804: No), the deduplication process 113/115 executes S1803 again.

In the above process, the reason why a check is performed on whether the reference counter 226 is set to 0 or not regardless of the ID being registered in the deletion container list 130/131 is that there is a case where, as a result of reflecting the deduplication information update log of the other node in S1802, the reference counter 226 is increased and changed to a value other than 0. This process enables to prevent the erroneous deletion of a container that should not be deleted. In the subsequent steps, the deletion of the container 119/124, the deletion of the container management table 128, the deletion of entry of the chunk-container table 127, and the registration of the deleted chunk-container table entry to the deduplication information update log 117/122 are performed.

In S1805, the deduplication process 113/115 registers the entry of the chunk-container table 127 storing the container ID shown by the entry extracted in S1804 to the deduplication information update log 117/122. For example, if the deletion target container ID is "BBB", and when the entry of the chunk-container table 127 where the container ID 232 is "BBB" is referred to, and "Node 0" is registered to the node ID 233, the deduplication process 113/115 registers "BBB" in the container ID field 1004, "Node 0" in the node ID field 1005, and "delete" in the update type 1006 of the deduplication information update log 117/122. The deduplication process 113/115 registers a value indicating the FP field 231 of the entry of the chunk-container table 127 in the FP field 1003. If there are multiple entries including the relevant container ID in the chunk-container table 127, the deduplication process 113/115 registers multiple entries in the deduplication information update log 117/122.

In S1806, the deduplication process 113/115 deletes the entry of the chunk-container table 127 storing the container ID illustrated by the entry extracted in S1804. In S1807, the deduplication process 113/115 deletes the container management table 128 shown by the container ID indicated by the entry extracted in S1804. In S1808, the deduplication process 113/115 deletes the container 119/124 indicated by the container ID shown by the entry extracted in S1804. Actually, the deduplication process 113/115 frees the area allocated for the container in the storage media 109/110.

Thereafter, the procedure returns to S1803, and repeats the above process until there is no more unprocessed entry in the deletion container list 130/131. When there are no more unprocessed entries (S1803: No), it advances to S1809, and initializes the deletion container list 130/131. Actually, the contents written in the deletion container list 130/131 are deleted. By the process of FIG. 18, it becomes possible to delete unnecessary containers (free storage areas in the storage media 109/110), so that storage areas can be used efficiently.

As described, according to the present embodiment, only non-duplicated chunks are stored in its own node, and the deduplication node can be improved. Further, it is possible to acquire a deduplication information of the other node and to monitor whether update has occurred or not, and if it is determined that update has occurred, the update information can be reflected in the deduplication information of its own node, and the communication between nodes will become unnecessary, so that high-speed deduplication between nodes can be realized.

The present invention is not restricted to the above-illustrated preferred embodiments, and can include various modifications. The above-illustrated embodiments are described in detail to help understand the present invention, and the present invention is not restricted to a structure including all the components illustrated above. Further, a portion of the configuration of an embodiment can be replaced with the configuration of another embodiment, or the configuration of a certain embodiment can be added to the configuration of another embodiment. Moreover, a portion of the configuration of each embodiment can be added to, deleted from or replaced with other configurations. A portion or whole of the above-illustrated configurations, functions, processing units, processing means and so on can be realized via hardware configuration such as by designing an integrated circuit. Further, the configurations and functions illustrated above can be realized via software by the processor interpreting and executing programs realizing the respective functions.

The information such as the programs, tables and files for realizing the respective functions can be stored in a storage device such as a memory, a hard disk or an SSD (Solid State Drive), or in a memory media such as an IC card, an SD card or a DVD. Only the control lines and information lines considered necessary for description are illustrated in the drawings, and not necessarily all the control lines and information lines required for production are illustrated. In actual application, it can be considered that almost all the components are mutually coupled.

REFERENCE SIGNS LIST

1: Computer system, 106: Storage system, 107: Node 0, 108: Node 1, 109: Storage media 0, 110: Storage media 1, 111: Memory, 112: Processor, 113: Deduplication process 0, 114: Deduplication information reflecting thread 0, 115: Deduplication process 1, 114: Deduplication information reflecting thread 1, 117/122: Deduplication information update log, 118/123: Deduplication information, 119/124: Container, 120/125: Log acquisition list, 121/126: Lock file, 127: Chunk-container table, 128: Container management table, 129: Content management table, 130/131: Deletion container list, 132: Switch, 226: Reference counter.

The invention claimed is:

1. A storage system of a cluster configuration for deduplicating and storing a content from a superior device, wherein
the storage system has two or more nodes with a storage device for storing a content by dividing the same into one or more chunks having a fixed length or a variable length;
wherein each node includes:
a deduplication information including a storage information for storing the content in a given area within the storage device and managing the same, for managing a result of execution of the deduplication; and
a deduplication information update log for reflecting the result of deduplication in its own node to a deduplication information in another node;
when a deduplication information update log not yet reflected to the deduplication information of its own node exists in another node, updates the not-yet-reflected deduplication information update log to the deduplication information of its own node; and
based on the reflected deduplication information of its own node, performs deduplication by determining whether a duplicated chunk exists in a content to be stored in its own node.

2. The storage system according to claim 1, wherein a unit of deduplication is either a whole content or a chunk.

3. The storage system according to claim 2, wherein each node further has a log acquisition list for storing and managing the deduplication information update log name acquired from another node, and determine whether the deduplication information update log of another node is already reflected in the deduplication information of its own node or not, based on the log acquisition list of its own node.

4. The storage system according to claim 3, wherein each node further has a lock file for storing and managing the deduplication information update log name being edited, and a deduplication information update log being edited stored in a lock file of another node will not be reflected in the deduplication information of its own node.

5. The storage system according to claim 4, wherein a file name in the deduplication information update log includes a date and time information.

6. The storage system according to claim 3, wherein each node deletes the deduplication information update log of its own node reflected in a deduplication information of another node.

7. The storage system according to claim 3, wherein a determination on whether the deduplication information update log of its own node is reflected to a deduplication information of another node or not is performed based on a log acquisition list of another node.

8. The storage system according to claim 2, wherein whether a portion or all of the chunks constituting a content received by the own node is stored in another node or not is determined by acquiring the deduplication information of another node, and
if it is already stored in another node, deduplication of a duplicated chunk is executed by the received content; and
a content of update of the deduplication information of another node is stored in a deduplication information update log in its own node.

9. The storage system according to claim 1, wherein when a chunk is newly stored in the storage device, information that an entry to the deduplication information has been added is stored in the deduplication information update log.

10. The storage system according to claim 1, wherein when a content read request from the superior device is received, a content connecting only a chunk stored in its own nodes or a content connecting the chunk stored in its own node and a chunk stored in another node, are transmitted to the superior device.

11. The storage system according to claim 1, wherein when a content deletion request is received from the superior device, information that a number of times of reference of a chunk constituting the content has been reduced is stored in the deduplication information update log, and the number of times of the deduplication information is reduced.

12. The storage system according to claim 11, wherein each node further has a container showing a storage information of the chunk in the storage device, and a deletion container list storing the information of a deletion target container; and
information of a container where the number of times of reference of the deduplication information is zero is registered in to the deletion container list.

13. The storage system according to claim 12, wherein when a container registered in the deletion container list is to be deleted in each node:
a content of a non-reflected deduplication information update log stored in another node is reflected in a deduplication information of its own node;
whether the number of times of reference of the deletion target container is zero or not is determined, and a container where the number is zero and a deduplication information corresponding to the container are deleted; and
the deletion is stored in the deduplication information update log.

14. The storage system according to claim 1, wherein
a timing for updating the deduplication information of its own node by the deduplication information update log of another node is one of the following: every given period of time, or when a number of times of writing of contents to its own node or a write data capacity has reached a threshold value stored in advance.

15. A method for eliminating duplicated data of a storage system having a cluster configuration for deduplicating and storing a content from a superior device, wherein
the storage system has two or more nodes with a storage device for storing a content by dividing the same into one or more chunks having a fixed length or a variable length;
wherein each node includes:
a deduplication information including a storage information for storing the content in a given area within the storage device and managing the same, for managing a result of execution of the deduplication; and
a deduplication information update log for reflecting the result of deduplication in its own node to a deduplication information in another node;
when a deduplication information update log not yet reflected to the deduplication information of its own node exists in another node, updates the not-yet-reflected deduplication information update log to the deduplication information of its own node; and
based on the reflected deduplication information of its own node, performs deduplication by determining whether a duplicated chunk exists in a content to be stored in its own node.

* * * * *